United States Patent
Tanikame et al.

(10) Patent No.: US 10,714,017 B2
(45) Date of Patent: *Jul. 14, 2020

(54) SCANNING DRIVE CIRCUIT AND DISPLAY DEVICE INCLUDING THE SAME

(71) Applicant: Sony Corporation, Tokyo (JP)

(72) Inventors: Takao Tanikame, Kanagawa (JP); Seiichiro Jinta, Chita-gun (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/913,373

(22) Filed: Mar. 6, 2018

(65) Prior Publication Data
US 2018/0197483 A1 Jul. 12, 2018

Related U.S. Application Data

(63) Continuation of application No. 15/596,463, filed on May 16, 2017, now Pat. No. 9,940,876, which is a (Continued)

(30) Foreign Application Priority Data

Jun. 6, 2008 (JP) .................. 2008-149171

(51) Int. Cl.
*G09G 3/3266* (2016.01)
*G03G 5/00* (2006.01)
(Continued)

(52) U.S. Cl.
CPC ............. *G09G 3/3266* (2013.01); *G09G 3/32* (2013.01); *G09G 3/325* (2013.01); *G09G 3/3208* (2013.01);
(Continued)

(58) Field of Classification Search
CPC ......... G06G 3/3266; G06G 2300/0819; G06G 2300/0861
(Continued)

(56) References Cited

U.S. PATENT DOCUMENTS 4,641,626 A   2/1987  Morino et al.
4,789,811 A  12/1988  Hulshof
(Continued)

FOREIGN PATENT DOCUMENTS

CA    001184243 A   3/1985
CN    201947234 U   8/2011
(Continued)

OTHER PUBLICATIONS

Korean Office Action dated Nov. 29, 2018 for corresponding Korean Application No. 10-2018-0028986.
(Continued)

*Primary Examiner* — Prabodh M Dharia
(74) *Attorney, Agent, or Firm* — Michael Best & Friedrich LLP

(57) ABSTRACT

A display device including a display area including a plurality of pixel circuits, a peripheral area including a scanning circuit, a plurality of first scanning lines, a plurality of second scanning lines, a plurality of third scanning lines, and a scanning circuit. The scanning circuit facing to a first side of the display area and configured to drive the pixel circuits via the first, the second and the third scanning lines.

14 Claims, 23 Drawing Sheets

Related U.S. Application Data continuation of application No. 15/149,507, filed on May 9, 2016, now Pat. No. 9,685,110, which is a continuation of application No. 14/541,497, filed on Nov. 14, 2014, now Pat. No. 9,373,278, which is a continuation of application No. 13/847,025, filed on Mar. 19, 2013, now Pat. No. 8,913,054, which is a continuation of application No. 12/453,754, filed on May 21, 2009, now Pat. No. 8,411,016.

(51) Int. Cl.
  *G09G 3/32* (2016.01)
  *G09G 3/3208* (2016.01)
  *G09G 3/325* (2016.01)
  *G09G 5/00* (2006.01)

(52) U.S. Cl.
  CPC ..... *G09G 5/001* (2013.01); *G09G 2300/0426* (2013.01); *G09G 2300/0439* (2013.01); *G09G 2300/0819* (2013.01); *G09G 2300/0861* (2013.01); *G09G 2310/0286* (2013.01)

(58) Field of Classification Search
  USPC .............. 345/76–82, 98–100, 204, 690, 698; 326/37; 315/169.3, 175; 257/58, 277, 257/E27, 111
  See application file for complete search history.

(56) References Cited

U.S. PATENT DOCUMENTS

| | | | |
|---|---|---|---|
| 5,032,772 A | 7/1991 | Gully et al. | |
| 5,148,058 A | 9/1992 | Stewart | |
| 5,576,601 A | 11/1996 | Koenck | |
| 5,951,902 A | 9/1999 | Goodman et al. | |
| 6,088,008 A | 7/2000 | Reeder | |
| 6,483,497 B1 | 11/2002 | Iino et al. | |
| 6,670,944 B1 | 12/2003 | Ishii | |
| 6,885,029 B2 | 4/2005 | Miyazawa | |
| 7,046,220 B2 | 5/2006 | Tagawa et al. | |
| 7,126,285 B2 | 10/2006 | Yuki | |
| 7,129,643 B2 | 10/2006 | Shin et al. | |
| 7,187,004 B2 | 3/2007 | Miyazawa | |
| 7,250,929 B2 | 7/2007 | Ota | |
| 7,307,605 B2 | 12/2007 | Shimoda | |
| 7,355,575 B1 | 4/2008 | Ota et al. | |
| 7,397,452 B2 | 7/2008 | Nakamura | |
| 7,403,179 B2 | 7/2008 | Koyama et al. | |
| 7,495,650 B2 | 2/2009 | Murade | |
| 7,499,003 B2 | 3/2009 | Rudolph et al. | |
| 7,538,749 B2 | 5/2009 | Chung et al. | |
| 7,683,878 B2 * | 3/2010 | Luo .......................... G09G 3/20 345/100 | |
| 7,697,656 B2 | 4/2010 | Katayama | |
| 7,777,701 B2 | 8/2010 | Eom | |
| 7,999,800 B2 | 8/2011 | Iwabuchi et al. | |
| 8,031,158 B2 | 10/2011 | Jang et al. | |
| 8,125,473 B2 | 2/2012 | Chung et al. | |
| 8,164,561 B2 | 4/2012 | Wang et al. | |
| 8,188,963 B2 | 5/2012 | Park | |
| 8,378,930 B2 | 2/2013 | Asano | |
| 8,427,458 B2 | 4/2013 | Tanikame et al. | |
| 8,912,995 B2 * | 12/2014 | Shin ...................... G09G 3/3677 345/100 | |
| 9,206,309 B2 | 12/2015 | Appleby | |
| 2002/0011994 A1 | 1/2002 | Imamura | |
| 2002/0145578 A1 * | 10/2002 | Ito ....................... G09G 3/3622 345/87 |
| 2002/0180722 A1 | 12/2002 | Yamashita et al. | |
| 2003/0128180 A1 | 7/2003 | Kim et al. | |
| 2003/0164085 A1 | 9/2003 | Morris | |
| 2004/0026723 A1 | 2/2004 | Miyazawa | |
| 2004/0070808 A1 | 4/2004 | Nakanishi | |
| 2004/0174334 A1 * | 9/2004 | Washio ................ G09G 3/3677 345/102 |
| 2004/0183758 A1 | 9/2004 | Chen et al. | |
| 2004/0196272 A1 | 10/2004 | Yamashita | |
| 2004/0263057 A1 | 12/2004 | Uchino | |
| 2005/0007357 A1 | 1/2005 | Yamashita et al. | |
| 2005/0030304 A1 | 2/2005 | Inukai | |
| 2005/0116747 A1 | 6/2005 | Shimoda | |
| 2005/0122289 A1 | 6/2005 | Yamazaki | |
| 2005/0156168 A1 | 7/2005 | Miyazawa | |
| 2005/0168425 A1 | 8/2005 | Takada et al. | |
| 2005/0179679 A1 | 8/2005 | Hosaka et al. | |
| 2005/0195148 A1 | 9/2005 | Iisaka | |
| 2005/0206589 A1 * | 9/2005 | Miyachi ............... G09G 3/3413 345/73 |
| 2005/0212732 A1 | 9/2005 | Aoki | |
| 2005/0219188 A1 | 10/2005 | Kawabe | |
| 2005/0237002 A1 | 10/2005 | Nakamura | |
| 2005/0243077 A1 | 11/2005 | Chung et al. | |
| 2005/0264493 A1 * | 12/2005 | Shin ...................... G09G 3/325 345/76 |
| 2005/0269959 A1 | 12/2005 | Uchino et al. | |
| 2005/0275647 A1 | 12/2005 | Numao | |
| 2005/0285827 A1 | 12/2005 | Eom | |
| 2006/0044230 A1 | 3/2006 | Eom | |
| 2006/0044255 A1 | 3/2006 | Lee | |
| 2006/0077168 A1 | 4/2006 | Fujita | |
| 2006/0092115 A1 | 5/2006 | Matono et al. | |
| 2006/0114200 A1 | 6/2006 | Yamashita et al. | |
| 2006/0170636 A1 | 8/2006 | Nakamura et al. | |
| 2006/0208974 A1 | 9/2006 | Hara | |
| 2006/0210012 A1 | 9/2006 | Yamaguchi et al. | |
| 2006/0221012 A1 * | 10/2006 | Ikeda ................... G09G 3/3233 345/76 |
| 2006/0248421 A1 | 11/2006 | Choi | |
| 2007/0008269 A1 | 1/2007 | Kimura | |
| 2007/0024541 A1 | 2/2007 | Ryu et al. | |
| 2007/0035534 A1 | 2/2007 | Yamazaki | |
| 2007/0063959 A1 | 3/2007 | Iwabuchi et al. | |
| 2007/0085778 A1 | 4/2007 | Yoshida | |
| 2007/0085781 A1 | 4/2007 | Chung et al. | |
| 2007/0115224 A1 | 5/2007 | Yamamoto | |
| 2007/0115225 A1 | 5/2007 | Uchino et al. | |
| 2007/0124633 A1 | 5/2007 | Kim | |
| 2007/0132673 A1 * | 6/2007 | Jinno ..................... G09G 3/006 345/76 |
| 2007/0132674 A1 * | 6/2007 | Tsuge ................... G09G 3/2074 345/77 |
| 2007/0195021 A1 | 8/2007 | Imamura | |
| 2007/0200804 A1 | 8/2007 | Kwon | |
| 2007/0222737 A1 | 9/2007 | Kimura | |
| 2007/0257861 A1 | 11/2007 | Zhang | |
| 2007/0257868 A1 | 11/2007 | Kasai | |
| 2007/0273619 A1 | 11/2007 | Kitazawa et al. | |
| 2007/0273621 A1 | 11/2007 | Yamashita et al. | |
| 2007/0279340 A1 | 12/2007 | Takahashi | |
| 2008/0005635 A1 | 1/2008 | Kaibel et al. | |
| 2008/0049053 A1 | 2/2008 | Asano et al. | |
| 2008/0367050 | 2/2008 | Iwashita et al. | |
| 2008/0084365 A1 | 4/2008 | Takahara | |
| 2008/0143648 A1 | 6/2008 | Ishizuka et al. | |
| 2008/0150846 A1 | 6/2008 | Chung | |
| 2008/0150875 A1 * | 6/2008 | Ieong ................... G09G 3/3677 345/100 |
| 2008/0150924 A1 | 6/2008 | Yamashita et al. | |
| 2008/0246698 A1 | 10/2008 | Eom | |
| 2008/0253608 A1 | 10/2008 | Long et al. | |
| 2008/0284704 A1 | 11/2008 | Song et al. | |
| 2009/0091579 A1 | 4/2009 | Teranishi et al. | |
| 2009/0115765 A1 | 5/2009 | Toyomura et al. | |
| 2009/0121998 A1 * | 5/2009 | Ohkawa ................ G09G 3/3688 345/100 |
| 2009/0207107 A1 | 8/2009 | Chung et al. | |
| 2009/0225104 A1 | 9/2009 | Hu et al. | |
| 2009/0231239 A1 * | 9/2009 | Goden ................... G09G 3/3233 345/76 |
| 2009/0309629 A1 | 12/2009 | Samuel | |
| 2010/0123691 A1 | 5/2010 | Nagumo | |

(56) References Cited

U.S. PATENT DOCUMENTS

| | | | |
|---|---|---|---|
| 2010/0328294 A1 | 12/2010 | Sasaki et al. | |
| 2011/0134154 A1* | 6/2011 | Miyachi | G09G 3/3413 345/690 |
| 2011/0248981 A1 | 10/2011 | Yoshida | |
| 2012/0075279 A1* | 3/2012 | Ishida | G09G 3/3677 345/211 |
| 2012/0313922 A1* | 12/2012 | Toyomura | G09G 3/3225 345/212 |
| 2013/0088524 A1 | 4/2013 | Yu Moto | |
| 2013/0207564 A1 | 8/2013 | Ota et al. | |
| 2013/0235022 A1 | 9/2013 | Tanikame et al. | |
| 2014/0304004 A1 | 10/2014 | Trethewey | |
| 2016/0307515 A1* | 10/2016 | Jinta | G09G 3/3258 |

FOREIGN PATENT DOCUMENTS

| | | |
|---|---|---|
| JP | 40325600 A | 11/1991 |
| JP | 05-216008 A | 8/1993 |
| JP | 2005-031630 | 2/2005 |
| JP | 2006-184871 A | 7/2006 |
| JP | 2008-250093 A | 10/2008 |
| JP | 2009-047746 A | 3/2009 |
| KR | 20050005646 A | 1/2005 |
| KR | 20060112994 A | 11/2006 |
| KR | 20080043221 A | 5/2008 |

OTHER PUBLICATIONS

Japanese Office Action dated Jun. 8, 2010 for corresponding Japanese Application No. 2008-149171.
Korean Office Action dated Jan. 17, 2017 for corresponding Korean Application No. 10-2016-0120563.
Korean Office Action dated Sep. 20, 2017 for corresponding Korean Application No. 10-2016-0120563.
Korean Office Action dated Apr. 30, 2018 for corresponding Korean Application No. 10-2018-0028986.

* cited by examiner

SCANNING DRIVE CIRCUIT AND DISPLAY DEVICE INCLUDING THE SAME

CROSS REFERENCES TO RELATED APPLICATIONS

This Application is a Continuation Application of U.S. patent application Ser. No. 15/596,463, filed May 16, 2017, which is a Continuation Application of U.S. patent application Ser. No. 15/149,507 filed May 9, 2016, now U.S. Pat. No. 9,685,110, issued Jun. 20, 2017, which is a Continuation Application of U.S. patent application Ser. No. 14/541,497 filed Nov. 14, 2014, now U.S. Pat. No. 9,373,278, issued on Jun. 21, 2016, which is a Continuation Application of U.S. patent application Ser. No. 13/847,025 filed Mar. 19, 2013, now U.S. Pat. No. 8,913,054, issued on Dec. 16, 2014, which is a Continuation Application of U.S. patent application Ser. No. 12/453,754 filed May 21, 2009, now U.S. Pat. No. 8,411,016, issued on Apr. 2, 2013, which in turn claims priority from Japanese Application No.: 2008-149171, filed on Jun. 6, 2008, the entire contents of which are incorporated herein by reference.

BACKGROUND OF THE INVENTION

1. Field of the Invention

The present invention relates to a scanning drive circuit and a display device including the same. More particularly, the invention relates to a scanning drive circuit in which a ratio between a display time period and a non-display time period in each of display elements composing a display device can be readily adjusted, and a display device including the same.

2. Description of the Related Art

In addition to a liquid crystal display device composed of voltage-driven liquid crystal cells, a display device including a light emitting portion (for example, an organic electro-luminescence light emitting portion) which emits a light by causing a current to flow through the light emitting portion, and a drive circuit for driving the same are known as a display device including display elements two-dimensionally disposed in a matrix.

A luminance of a display element including a light emitting portion which emits a light by causing a current to flow through the light emitting portion is controlled in accordance with a value of the current caused to flow through the light emitting portion. A simple matrix system and an active matrix system are well known as a drive system in the display device as well including such a display element (for example, the organic electro-luminescence display device) similarly to the case of the liquid crystal display device. Although the active matrix system has a disadvantage that a configuration is complicated as compared with the simple matrix system, the active matrix system has various advantages that a high luminance can be obtained for an image, and so forth.

Various drive circuits each including a transistor and a capacitor portion are well known as a circuit for driving a light emitting portion in accordance with the active matrix system. For example, Japanese Patent Laid-Open No. 2005-31630 discloses a display device using a display element including an organic electro-luminescence light emitting portion and a drive circuit for driving the same, and a method of driving the display device. The drive circuit is a drive circuit including six transistors and one capacitor portion (hereinafter referred to as a 6Tr/1C drive circuit). FIG. 19 shows an equivalent circuit diagram of a drive circuit (6Tr/1C drive circuit) composing a display element belonging to an m-th row and an n-th column in a display device having display elements two-dimensionally disposed in a matrix. It should be noted that a description will now be given on the assumption that the display elements are scanned in a line sequential manner every row.

The 6Tr/1C drive circuit includes a write transistor $TR_W$, a drive transistor $TR_D$, and a capacitor portion $C_1$. Also, the 6Tr/1C drive circuit includes a first transistor $TR_1$, a second transistor $TR_2$, a third transistor $TR_3$, and a fourth transistor $TR_4$.

In the write transistor $TR_W$, one source/drain region is connected to a data line $DTL_n$, and a gate electrode is connected to a scanning line $SCL_m$. In the drive transistor $TR_D$, one source/drain region is connected to the other source/drain region of the write transistor $TR_W$ to compose a first node $ND_1$. One terminal of the capacitor portion $C_1$ is connected to a power supply line $PS_1$. In the capacitor portion $C_1$, a predetermined reference voltage (a voltage $V_{CC}$ in the example of the related art shown in FIG. 19, which will be described later) is applied to one terminal, and the other terminal and a gate electrode of the drive transistor $TR_D$ are connected to each other to compose a second node $ND_2$. The scanning line $SCL_m$ is connected to a scanning circuit (not shown), and a data line $DTL_n$ is connected to a signal outputting circuit 100.

In the first transistor $TR_1$, one source/drain region is connected to the second node $ND_2$, and the other source/drain region is connected to the other source/drain region of the drive transistor $TR_D$. The first transistor $TR_1$ composes a switch circuit portion connected between the second node $ND_2$ and the other source/drain region of the drive transistor $TR_D$.

In second transistor $TR_2$, one source/drain region is connected to a power source line $PS_3$ to which a predetermined initialization voltage $V_{Ini}$ (for example, 4 V) in accordance with which a potential at the second node $ND_2$ is initialized is applied, and the other source/drain region is connected to the second node $ND_2$. The second transistor $TR_2$ composes a switch circuit portion connected between the second node $ND_2$ and the power supply line $PS_3$ to which the predetermined initialization voltage $V_{Ini}$ is applied.

In the third transistor $TR_3$, one source/drain region is connected to the power supply line $PS_1$ to which a predetermined drive voltage $V_{CC}$ (for example, 10 V) is applied, and the other source/drain region is connected to the first node $ND_1$. The third transistor $TR_3$ composes a switch circuit portion connected between the first node $ND_1$ and the power supply line $PS_1$ to which the predetermined drive voltage $V_{CC}$ is applied.

In the fourth transistor $TR_4$, one source/drain region is connected to the other source/drain region of the drive transistor $TR_D$, and the other source/drain region is connected to one terminal of a light emitting portion ELP (more specifically, an anode electrode of the light emitting portion ELP). The fourth transistor $TR_4$ composes a switch circuit portion connected between the other source/drain region of the drive transistor $TR_D$, and the one terminal of the light emitting portion ELP.

Each of the gate electrode of the write transistor $TR_W$, and the gate electrode of the first transistor $TR_1$ is connected to the scanning line $SCL_m$. The gate electrode of the second transistor $TR_2$ is connected to an initialization control line $AZ_m$. A scanning signal supplied to a scanning line $SCL_{m-1}$ (not shown) which is scanned right before the scanning line $SCL_m$ is supplied to the initialization control line $AZ_m$ as well. Each of the gate electrode of the third transistor $TR_3$, and the gate electrode of the fourth transistor $TR_4$ is connected to a display control line $CL_m$ through which a display state/non-display state of the display element is controlled.

For example, each of the write transistor $TR_W$, the drive transistor $TR_D$, the first transistor $TR_1$, the second transistor $TR_2$, the third transistor $TR_3$, and the fourth transistor $TR_4$ is composed of a p-channel Thin Film Transistor (TFT). Also, the light emitting portion ELP is provided on an interlayer insulating layer or the like which is formed so as to cover the drive circuit. In the light emitting portion ELP, the anode electrode is connected to the other source/drain region of the fourth transistor $TR_4$, and a cathode electrode is connected to the power supply line $PS_2$. A voltage $V_{cat}$ (for example, 10 V) is applied to the cathode electrode of the light emitting portion ELP. In FIG. 19, reference symbol $C_{EL}$ designates a parasitic capacitance parasitized on the light emitting portion ELP.

When transistors are composed of TFTs, it may be impossible that threshold voltages thereof disperse to a certain extent. When amounts of currents caused to flow through the light emitting portions ELP, respectively, disperse along with a dispersion of the threshold voltages of the drive transistors $TR_D$, uniformity of the luminances in the display device becomes worse. For this reason, it is necessary that even when the threshold voltages of the drive transistors $TR_D$ disperse, the amounts of currents caused to flow through the light emitting portions ELP, respectively, are prevented from being influenced by this dispersion. As will be described later, the light emitting portions ELP are driven so as not to be influenced by the dispersion of the threshold voltages of the drive transistors $TR_D$.

A method of driving the display element belonging to the m-th row and the n-th column in the display device in which the display elements are two-dimensionally disposed in a matrix of N×M will be described hereinafter with reference to FIGS. 20A to 20D. FIG. 20A shows a schematic timing chart of the signals on the initialization control line $AZ_m$, the scanning line $SCL_m$, and the display control line $CL_m$, respectively. FIGS. 20B, 20C and 20D respectively schematically show an ON/OFF state and the like of each of the write transistor $TR_W$, the drive transistor $TR_D$, the first transistor $TR_1$, the second transistor $TR_2$, the third transistor $TR_3$, and the fourth transistor $TR_4$ in the 6TR/1C drive circuit. For the sake of convenience of the description, a time period for which the initialization control line $AZ_m$ is scanned is called an (m−1)-th horizontal scanning time period, and a time period for which the scanning line $SCL_m$ is scanned is called an m-th horizontal scanning time period.

As shown in FIG. 20A, an initializing process is carried out for the (m−1)-th horizontal scanning time period. The initializing process will now be described in detail with reference to FIG. 20B. For the (m−1)-th horizontal scanning time period, a potential of the initialization control line $AZ_m$ changes from a high level to a low level, and a potential of the display control line $CL_m$ changes from the low level to the high level. It is noted that a potential of the scanning line $SCL_m$ is held at the high level. Therefore, for the (m−1)-th horizontal scanning time period, the write transistor $TR_W$, the first transistor $TR_1$, the third transistor $TR_3$, and the fourth transistor $TR_4$ are each in an OFF state. On the other hand, the second transistor $TR_2$ is held in an ON state.

The predetermined initialization voltage $V_{Ini}$ in accordance with which the potential at the second node $ND_2$ is initialized is applied to the second node $ND_2$ through the second transistor $TR_2$ held in the ON state. As a result, the potential at the second node $ND_2$ is initialized.

Next, as shown in FIG. 20A, for the m-th horizontal scanning time period, a video signal $V_{sig}$ is written to the display element concerned. At this time, processing for canceling the threshold voltage $V_{th}$ of the drive transistor $TR_D$ is executed together with the write operation. Specifically, the second node $ND_2$ and the other source/drain region of the drive transistor $TR_D$ are electrically connected to each other, so that the video signal $V_{sig}$ is applied from the data line $DTL_n$ to the first node $ND_1$ through the write transistor $TR_W$ which is held in the ON state in accordance with a signal from the scanning line $SCL_m$. As a result, the potential at the second node $ND_2$ changes toward a potential obtained by subtracting the threshold voltage $V_{th}$ of the drive transistor $TR_D$ from the video signal $V_{sig}$.

A detailed description will be given with reference to FIGS. 20A and 20C. For the m-th horizontal scanning time period, the potential of the initialization control line $AZ_m$ changes from the low level to the high level, and the potential of the scanning line $SCL_m$ changes from the high level to the low level. It is noted that the potential of the display control line $CL_m$ is held at the high level. Therefore, for the m-th horizontal scanning time period, the write transistor $TR_W$ and the first transistor $TR_1$ are each held in the ON state. On the other hand, the second transistor $TR_2$, the third transistor $TR_3$, and the fourth transistor $TR_4$ are each held in the OFF state.

The second node $ND_2$, and the other source/drain region of the drive transistor $TR_D$ are electrically connected to each other through the first transistor $TR_1$ held in the ON state. Thus, the video signal $V_{sig}$ is applied from the data line $DTL_n$ to the first node $ND_1$ through the write transistor $TR_W$ which is held in the ON state in accordance with the signal from the scanning line $SCL_m$. As a result, the potential at the second node $ND_2$ changes toward the potential obtained by subtracting the threshold voltage $V_{th}$ of the drive transistor $TR_D$ from the video signal $V_{sig}$.

That is to say, if the potential at the second node $ND_2$ is initialized in the initializing process described above so that the drive transistor $TR_D$ is turned ON at commencement of the m-th horizontal scanning time period, the potential at the second node $ND_2$ changes toward the potential of the video signal $V_{sig}$ applied to the first node $ND_1$. However, when a difference in potential between the gate electrode and one source/drain region of the drive transistor $TR_D$ reaches the threshold voltage $V_{th}$ of the drive transistor $TR_D$, the drive transistor $TR_D$ is turned OFF. For the OFF state, the potential at the second node $ND_2$ is approximately expressed by $(V_{sig}-V_{th})$.

Next, the current is caused to flow through the light emitting portion ELP via the drive transistor $TR_D$, thereby driving the light emitting portion ELP.

A detailed description will now be given with reference to FIGS. 20A and 20D. The potential at the scanning line $SCL_m$ changes from the low level to the high level at the termination of the m-th horizontal scanning time period. In addition, the potential of the display control line $CL_m$ changes from the high level to the low level. It should be noted that the potential of the initialization control line $AZ_m$ is held at the high level. The third transistor $TR_3$ and the fourth transistor $TR_4$ are each held in the ON state. On the other hand, the write transistor $TR_W$, the first transistor $TR_1$, and the second transistor $TR_2$ are each held in the OFF state.

The drive voltage $V_{CC}$ is applied to one source/drain region of the drive transistor $TR_D$ through the third transistor $TR_3$ held in the ON state. In addition, the other source/drain region of the drive transistor $TR_D$ and one terminal of the light emitting portion ELP are electrically connected to each other through the fourth transistor $TR_4$ held in the ON state.

The current caused to flow through the light emitting portion ELP is a drain current $I_{ds}$ which is caused to flow from the source region to the drain region of the drive transistor $TR_D$. Thus, when the drive transistor $TR_D$ ideally operates in a saturated region, the drain current $I_{ds}$ can be expressed by Expression (1):

$$I_{ds} = k \cdot \mu \cdot (V_{gs} - V_{th})^2 \quad (1)$$

where $\mu$ is an effective mobility, $V_{th}$ is a threshold voltage, $V_{gs}$ is a voltage developed across the source region and the gate electrode of the drive transistor $TR_D$, and k is a constant.

Here, the constant k is given by Expression (2):

$$k = (1/2) \cdot (W/L) \cdot C_{ox} \quad (2)$$

where L is a channel length, W is a channel width, and $C_{ox}$=(relative permeability of gate insulating layer)×(permittivity of vacuum)/(thickness of gate insulating layer).

Thus, as shown in FIG. 20D, the drain current $I_{ds}$ is caused to flow through the light emitting portion ELP, so that the light emitting portion ELP emits a light with a luminance corresponding to the drain current $I_{ds}$.

Also, the voltage $V_{gs}$ is given by Expression (3):

$$V_{gs} \approx V_{CC} - (V_{sig} - V_{th}) \quad (3)$$

Therefore, Expression (1) can be transformed into Expression (4):

$$I_{ds} = k \cdot \mu \cdot \{V_{CC} - (V_{sig} - V_{th}) - V_{th}\}^2 \quad (4)$$
$$= k \cdot \mu \cdot (V_{CC} - V_{sig})^2$$

As apparent from Expression (4), the threshold voltage $V_{th}$ of the drive transistor $TR_D$ has no relation to the value of the drain current $I_{ds}$. In other words, the drain current $I_{ds}$ corresponding to the video signal $V_{sig}$ can be caused to flow through the light emitting portion ELP without being influenced by the value of the threshold voltage $V_{th}$ of the drive transistor $TR_D$. According to the driving method described above, the dispersion of the threshold voltages $V_{th}$ of the drive transistors $TR_D$ is prevented from exerting an influence on any of the luminances of the display elements.

SUMMARY OF THE INVENTION

In order to operate the display device including the display element described above, it is necessary to provide circuits for supplying signals to the scanning lines, the initialization control lines, and the display control lines, respectively. The circuits for supplying these signals are preferably a circuit having an integrated configuration from a viewpoint of reduction of a layout area occupied by these circuits, reduction of the circuit cost, and the like. In addition, the circuits preferably have such a configuration that setting of widths of pulses supplied to the display control lines, respectively, can be readily changed without exerting an influence on the signals supplied to the scanning lines and the initialization control lines, respectively, from a viewpoint of improving moving image characteristics by increasing a rate of the non-display time period.

Embodiments of the present invention have been made in order to solve the problems described above, and it is therefore desirable to provide a scanning drive circuit which is capable of supplying signals to scanning lines, initialization control lines, and display control lines, respectively, and readily changing setting of widths of pulses supplied to the display control lines, respectively, and a display device including the same.

In order to attain the desire described above, according to an embodiment of the present invention, there is provided a display device including:

(1) display elements two-dimensionally disposed in a matrix;

(2) scanning lines, initialization control lines, and display control lines extending in a first direction;

(3) data lines extending in a second direction different from the first direction; and (4) a scanning drive circuit;

the scanning drive circuit including:

(A) a shift register portion including a plurality of shift registers, the shift register portion serving to successively shift a start pulse inputted thereto, thereby outputting output signals from the plurality of shift registers, respectively; and (B) a logical circuit portion including a plurality of logical circuits, the logical circuit portion being adapted to operate based on the output signals outputted from the shift register portion, respectively, and two or more kinds of enable signals;

in which each of the plurality of logical circuits outputs a signal based on;

(a) an input signal to corresponding one of the shift registers;

(b) an output signal from the corresponding one of the shift registers; and (c) at least one enable signal;

a signal based on corresponding one, of the output signals, from corresponding one of the shift registers in the shift register portion is supplied to the m-th display element through the m-th display control line;

a signal based on corresponding one, of the output signals, from corresponding one of the logical circuits, is supplied to the m-th display element through the m-th scanning line; and a signal which is supplied to the (m−1)-th scanning line is supplied to the m-th display element through the m-th initialization control line.

In the display device, of the embodiments of the present invention, including a scanning drive circuit according to an embodiment of the present invention, signals necessary for the scanning lines, the initialization control lines, and the display control lines are supplied based on the signals from the scanning drive circuit. As a result, it is possible to realize the reduction of the layout area occupied by the circuits for supplying the signals, and the reduction of the circuit cost. Values of P and Q may be suitably set in accordance with the specifications or the like of the scanning drive circuit, and the display device including the same.

In addition, in the display device according to the embodiments of the present invention, the signals based on the output signals from the shift registers composing the scanning drive circuit are supplied to the display control lines, respectively. In the scanning drive circuit according to the embodiments of the present invention, the position of termination of a start pulse which is successively shifted by the shift register especially exerts no influence on an operation of a negative AND circuit portion. Therefore, the setting of the widths of the pulses which are supplied to the display control lines, respectively, can be readily changed by easy means for changing the start pulse inputted to the shift register in a first stage without exerting an influence on each of the scanning lines and the initialization control lines.

It is noted that the scanning signal from the negative AND circuit portion, or the output signal from the shift register may be inverted in polarity thereof and supplied depending on a polarity or the like of the transistor composing the display element. "The signal based on the scanning signal" is sometimes the scanning signal itself, otherwise the signal having the inversed polarity. Likewise, "the signal based on the corresponding one, of the output signals, from the corresponding one of the shift registers" is sometimes the output signal from the corresponding one of the shift registers, otherwise the signal having an inverted polarity.

The scanning drive circuit according to the embodiments of the present invention can be manufactured by utilizing the generally well-known semiconductor device manufacturing technology. The shift register composing the shift register portion, and the negative AND circuit or the negative logical circuit composing the logical circuit portion can have the generally well-known configurations and structures, respectively. The scanning drive circuit may be configured in the form of a single circuit, or may be configured integrally with the display device. For example, when the display element composing the display device includes a transistor, the scanning drive circuit can be formed concurrently with the display device in the manufacture process of the display element concerned.

In the display device according to the embodiments of the present invention, it is possible to generally use the display element having such a configuration that the display element is scanned in accordance with the signal from the corresponding one of the scanning lines, and an initializing process is carried out based on the signal from the corresponding one of the initialization control lines. Also, it is possible to generally use the display element having such a configuration that a display time period and a non-display time period are changed from each other in accordance with the signal from the corresponding one of the display control lines.

In the display device according to the embodiments of the present invention, preferably, the display element includes:

(1-1) a drive circuit including a write transistor, a drive transistor, and a capacitor portion; and (1-2) a light emitting portion through which a current is caused to flow via the drive transistor.

A light emitting portion which emits a light by causing a current to flow through the light emitting portion can be generally used as the light emitting portion. For example, an organic electro-luminescence light emitting portion, an inorganic electro-luminescence light emitting portion, an LED light emitting portion, a semiconductor laser light emitting portion, or the like can be given as the light emitting portion. Among other things, from the view point of composing a flat panel color display device, preferably, the light emitting portion is composed of the organic electro-luminescence light emitting portion. Also, in the drive circuit composing the display element described above (the drive circuit may be simply referred to as "a drive circuit composing the display device according to the embodiments of the present invention"), preferably, in the write transistor, (a-1) one source/drain region is connected to corresponding one of the drain lines; and (a-2) a gate electrode is connected to corresponding one of the scanning lines;

in the drive transistor, (b-1) one source/drain region is connected to the other source/drain region of the write transistor, thereby composing a first node;

in the capacitor portion, (c-1) a predetermined reference voltage is applied to one terminal; and (c-2) the other terminal, and a gate electrode of the drive transistor are connected to each other, thereby composing a second node; and the write transistor is controlled in accordance with a signal from corresponding one of the scanning lines.

Also, in the display device according to the embodiments of the present invention, preferably, the drive circuit composing the display element further includes:

(d) a first switch circuit portion connected between the second node, and the other source/drain region of the drive transistor;

in which the first switch circuit portion is controlled in accordance with a signal from corresponding one of the scanning lines.

In addition, in the display device according to the embodiments of the present invention, preferably, the drive circuit composing the display element further includes:

(e) a second switch circuit portion connected between the second node, and a power supply line to which a predetermined initialization voltage is applied;

in which the second switch circuit portion is controlled in accordance with a signal from corresponding one of the initialization control line.

Also, in the display device according to the embodiments of the present invention, preferably, the drive circuit composing the display element further includes:

(f) a third switch circuit portion connected between the first node, and a power supply line to which a drive voltage is applied;

in which the third switch circuit portion is controlled in accordance with a signal from corresponding one of the display control lines.

In addition, in the display device according to the embodiments of the present invention, preferably, the drive circuit composing the display element further includes:

(g) a fourth switch circuit portion connected between the other source/drain region of the drive transistor, and one terminal of the light emitting portion;

in which the fourth switch circuit portion is controlled in accordance with a signal from corresponding one of the display control lines.

According to another embodiment of the present invention, there is provided a scanning drive circuit includes:

(A) a shift register portion including a plurality of shift registers, the shift register portion serving to successively shift a start pulse inputted thereto, thereby outputting output signals from the plurality of shift registers, respectively; and (B) a logical circuit portion including a plurality of logical circuits, the logical circuit portion being adapted to operate based on the output signals outputted from the shift registers, respectively, and two or more kinds of enable signals;

in which each of the logical circuits outputs a signal based on;

(a) an input signal to corresponding one of the shift registers;

(b) an output signal from the corresponding one of the shift registers; and (c) at least one enable signal;

a signal based on corresponding one, of the output signals, from corresponding one of the shift registers in the shift register portion is supplied to the m-th display element through the m-th display control line;

a signal based on corresponding one, of the output signals, from corresponding one of the logical circuits, is supplied to the m-th display element through the m-th scanning line; and a signal which is supplied to the (m−1)-th scanning line is supplied to the m-th display element through the m-th initialization control line.

In the display element having the drive circuit including the first to fourth switch circuit portions described above, (a) an initializing process for turning OFF the second switch circuit portion after a predetermined initialization voltage is applied from corresponding one of the power supply lines to the second node through the second switch circuit portion held in the ON state, thereby setting a potential at the second node at a predetermined reference potential is carried out.

(b) Next, a write process for turning ON the first switch circuit portion while the second switch circuit portion, the third switch circuit portion, and the fourth switch circuit portion are held in the OFF state, applying a video signal from corresponding one of the data lines to the first node through the write transistor held in the ON state in accordance with the signal supplied from corresponding one of the scanning lines in a state in which the second node, and the other source/drain region of the drive transistor are electrically connected to each other through the first switch circuit portion held in the ON state, thereby changing the potential at the second node toward a potential obtained by subtracting a threshold voltage of the drive transistor from the video signal is carried out.

(c) After that, the write transistor is turned OFF in accordance with a signal from corresponding one of the scanning lines.

(d) Next, the other source/drain region of the drive transistor, and one terminal of the light emitting portion are electrically connected to each other through the fourth switch circuit portion held in the ON state while the first switch circuit portion and the second switch circuit portion are each held in the OFF state, and a predetermined drive voltage is applied from corresponding one of the power supply lines to the first node through the third switch circuit portion held in the ON state, thereby causing a current to flow through the light emitting portion via the drive transistor.

In the manner as described above, the light emitting portion can be driven.

In the drive circuit composing the display element according to the embodiments of the present invention, the predetermined reference voltage is applied to one terminal of the capacitor portion. As a result, the potential at one terminal of the capacitor portion is held in a phase of the operation of the display device. A value of the predetermined reference voltage is not especially limited. For example, a configuration may also be adopted such that one terminal of the capacitor portion is connected to corresponding one, of the power supply lines, through which a predetermined voltage is applied to the other terminal of the light emitting portion, and a predetermined voltage is applied as the reference voltage.

In the display device, according to the embodiments of the present invention, including the various preferred configurations described above, the well known configurations and structures may be adopted as the configurations and structures of the various wirings such as the scanning lines, the initialization control lines, the display control lines, the data lines, and the power supply lines. In addition, the well known configuration and structure may be adopted as the configuration and structure of the light emitting portion. Specifically, when the organic electro-luminescence light emitting portion is used as the light emitting portion, for example, the light emitting portion can include an anode electrode, a hole transporting layer, a light emitting layer, an electron transporting layer, a cathode electrode, and the like. Also, the well known configuration and structure may also be adopted as the configurations and the structures of a signal outputting circuit connected to the data lines, and the like.

The display device according to the embodiments of the present invention may have a configuration for so-called monochrome display. Or, one pixel may include a plurality of sub-pixels. Specifically, one pixel may include three sub-pixels of a sub-pixel for red light emission, a sub-pixel for green light emission, and a sub-pixel for blue light emission. Moreover, one pixel may include a set of sub-pixels obtained by further adding one kind or plural kinds of sub-pixels to the three kinds of sub-pixels. In this case, the set of sub-pixels may be a set of sub-pixels obtained by adding a sub-pixel for emitting a white light for luminance enhancement to the three kinds of sub-pixels, a set for sub-pixels obtained by adding a sub-pixel for emitting a complementary color to the three kinds of sub-pixels for the purpose of enlarging a color reproduction range, a set of sub-pixels obtained by adding a sub-pixel for emitting a yellow light to the three kinds of sub-pixels for the purpose of enlarging a color reproduction range, or a set of sub-pixels obtained by adding a sub-pixel for emitting a yellow light, and a sub-pixel for emitting a cyan light to the three kinds of sub-pixels for the purpose of enlarging a color reproduction range.

Some of resolutions for image display such as (1920, 1035), (720, 480), and (1280, 960) as well as VGA (640, 480), S-VGA (800, 600), XGA (1024, 768), APRC (1152, 900), S-XGA (1280, 1024), U-XGA (1600, 1200), HD-TV (1920, 1080), and Q-XGA (2048, 1536) can be exemplified as values of pixels in the display device. However, the present invention is by no means limited to these values. In the case of the monochrome display device, basically, the display elements the number of which is identical to the number of pixels are formed in a matrix. On the other hand, in the case of the color display device, basically, the display elements the number of which is three times as large as that of the number of pixels are formed in a matrix. The display elements may be disposed in a stripe shape, or may be disposed in a delta shape. The dispersion of the display elements may be suitably set in accordance with the design of the display device.

In the drive circuit composing the display element in the display device according to the embodiments of the present invention, each of the write transistor and the drive transistor, for example, can be configured in the form of a p-channel Thin Film Transistor (TFT). It is noted that the write transistor may be in the form of an n-channel TFT. Each of the first switch circuit portion, the second switch circuit portion, the third switch circuit portion, and the fourth switch circuit portion can be composed of the well-known switching element such as the TFT. For example, each of the first switch circuit portion, the second switch circuit portion, the third switch circuit portion, and the fourth switch circuit portion may be composed of a p-channel TFT, or may be composed of an n-channel TFT.

In the drive circuit composing the display element in the display device according to the embodiments of the present invention, the capacitor portion composing the drive circuit, for example, can include one electrode, the other electrode, and a dielectric layer (insulating layer) sandwiched between these electrodes. The transistors and the capacitor portion composing the drive circuit are formed within a certain plane, and, for example, are formed on a supporting body.

When the light emitting portion is configured in the form of the organic electro-luminescence light emitting portion, the light emitting portion, for example, is formed above the transistors and the capacitor portion composing the drive circuit through the interlayer insulating layer. In addition, the other source/drain region of the drive transistor, for example, is connected to one terminal of the light emitting portion (such as the anode electrode of the light emitting portion) through other transistors and the like. It is noted that a configuration may also be adopted such that the transistors are formed on a semiconductor substrate or the like.

In the two source/drain regions which one transistor has, the wording "one source/drain region" is used in a sense of the source/drain region on the side connected to the power source side in some cases. In addition, the wording "the transistor is held in the ON state" means the state in which a channel is formed between the adjacent two source/drain regions. In this case, it does not matter whether or not the current is caused to flow from one source/drain region to the other source/drain region of the transistor concerned. On the other hand, the wording "the transistor is held in the OFF state" means that no channel is formed between the adjacent two source/drain regions. In addition, the wording "the source/drain region of a certain transistor is connected to the source/drain region of another transistor" includes a form in which the source/drain region of the certain transistor and the source/drain region of another transistor occupy the same region. In addition thereto, not only the source/drain region is made of a conductive material such as polysilicon or amorphous silicon containing therein an impurity, but also the source/drain region is formed from a layer made of a metal, an alloy, conductive particles, a laminated structure thereof, or an organic material (conductive high molecule). In addition, in each of timing charts used in the following description, a length (time length) of an abscissa axis representing time periods is merely schematic one, and does not represent rates of the time lengths of the time periods.

According to the present invention, the signals necessary for the scanning lines, the initialization control lines, and the display control lines are supplied based on the signals from the scanning drive circuit. As a result, it is possible to realize the reduction of the layout area occupied by the circuits for supplying the signals, and the reduction of the circuit cost.

According to the display device of the present invention, the signals based on the output signals from the respective shift registers composing the scanning drive circuit are supplied to the display control lines, respectively. Also, according to the scanning drive circuit of the present invention, the position of the termination of the start pulse which is successively shifted by the shift registers does not especially exert an influence on the operation of the negative AND circuit portion. Therefore, the setting of the widths of the pulses supplied to the display control lines, respectively, can be readily changed by the easy means for changing the start pulse inputted to the shift register in the first stage without exerting an influence on the signals supplied to the scanning lines and the initialization control lines, respectively. As a result, the non-display time period in the display element can be suitably set in accordance with the design of the display device.

DETAILED DESCRIPTION OF THE PREFERRED EMBODIMENTS

The preferred embodiments of the present invention will be described in detail hereinafter with reference to the accompanying drawings.

Embodiment 1

A scanning drive circuit of the present invention, and a display device including the same will now be described based on Embodiment 1 thereof. The display device of Embodiment 1 is a display device using a display element including a light emitting portion and a circuit for driving the light emitting portion.

Figure 1:
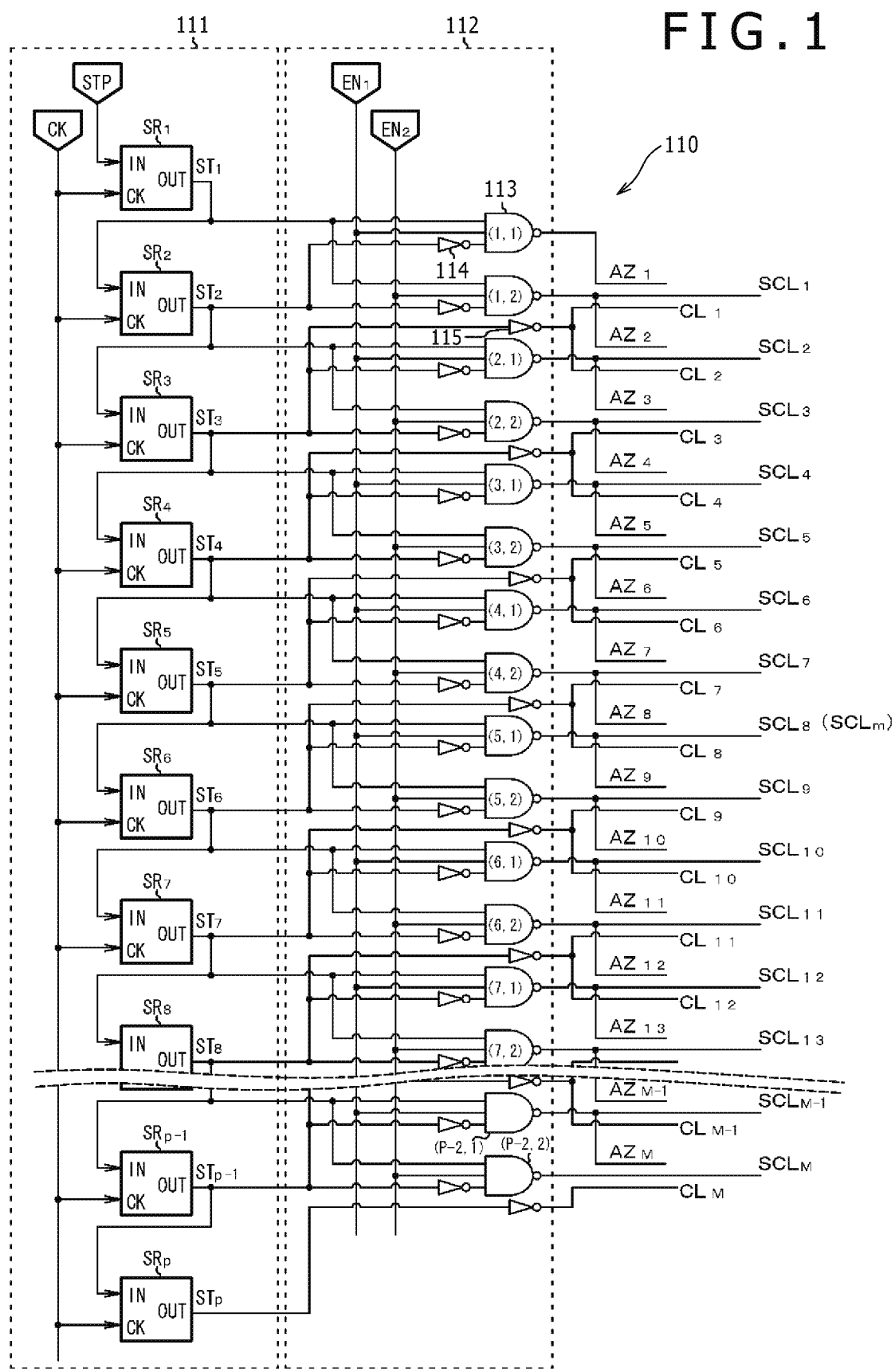
FIG. 1 is a circuit diagram showing a configuration of a scanning drive circuit according to Embodiment 1 of the present invention.
Figure 2:
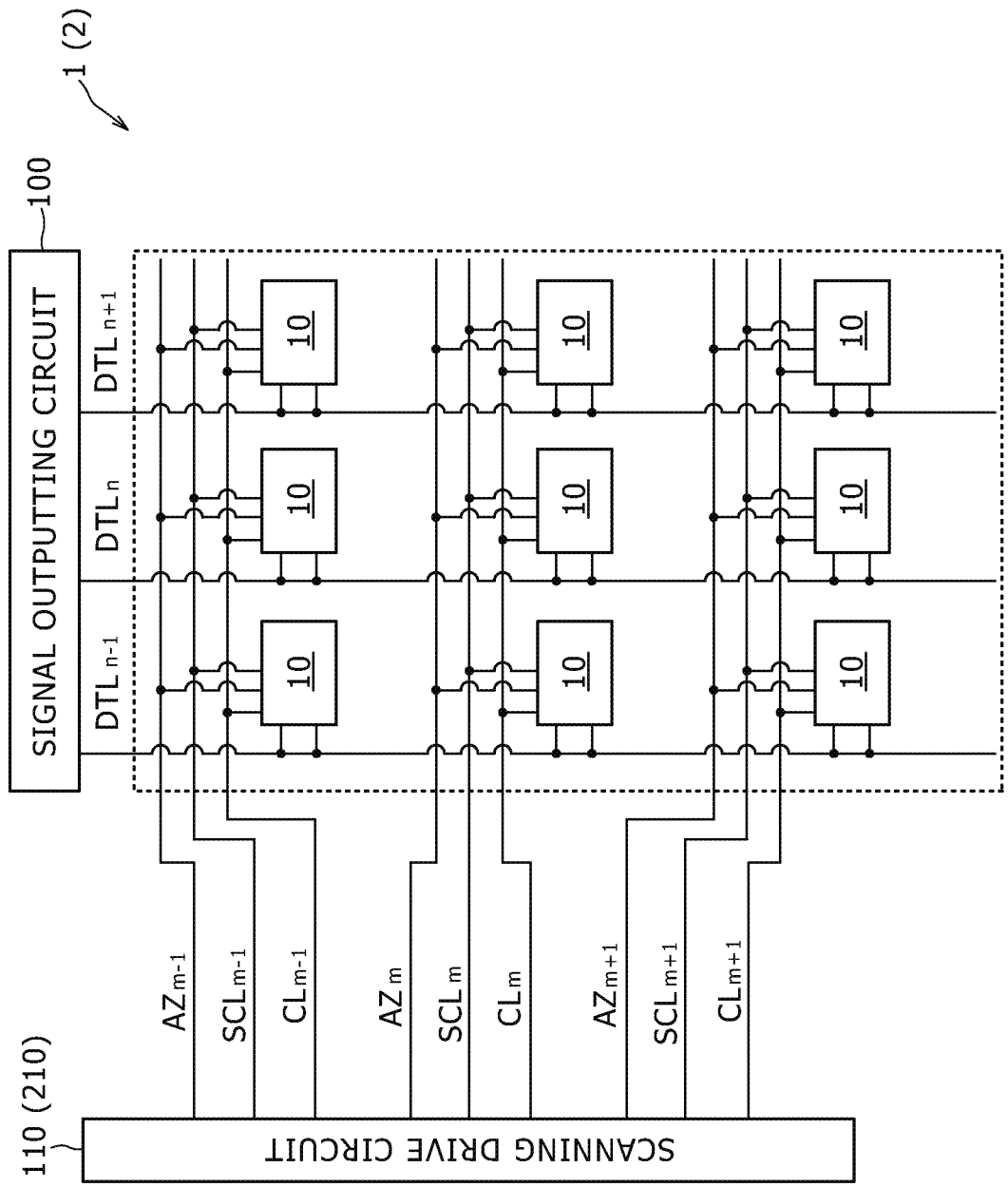
FIG. 2 is a conceptual block diagram showing a configuration of a display device, according to Embodiment 1 of the present invention, including the scanning drive circuit shown in FIG. 1.
Figure 3:
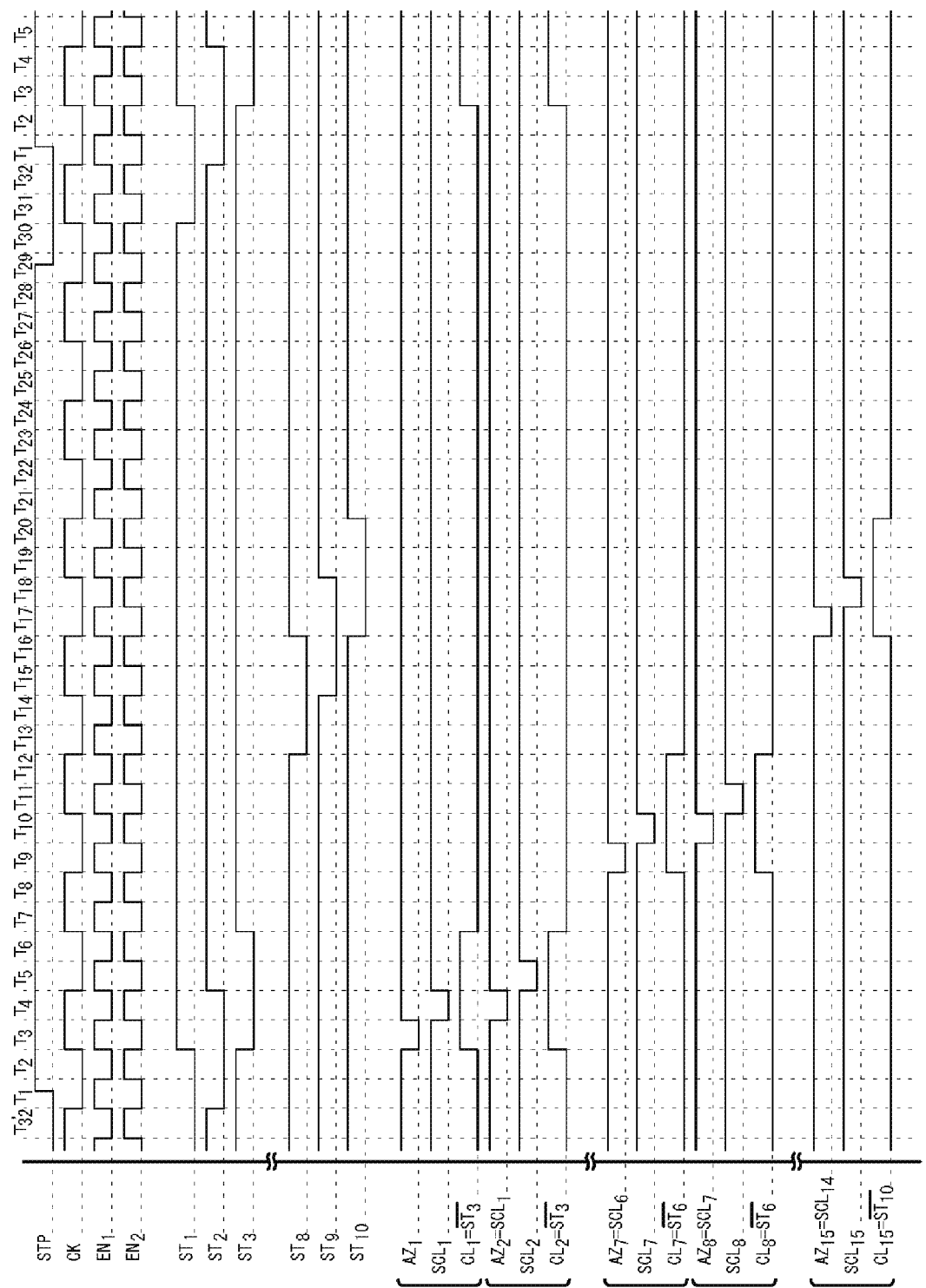
FIG. 3 is a schematic timing chart explaining an operation of the scanning drive circuit shown in FIG. 1.
Figure 4:
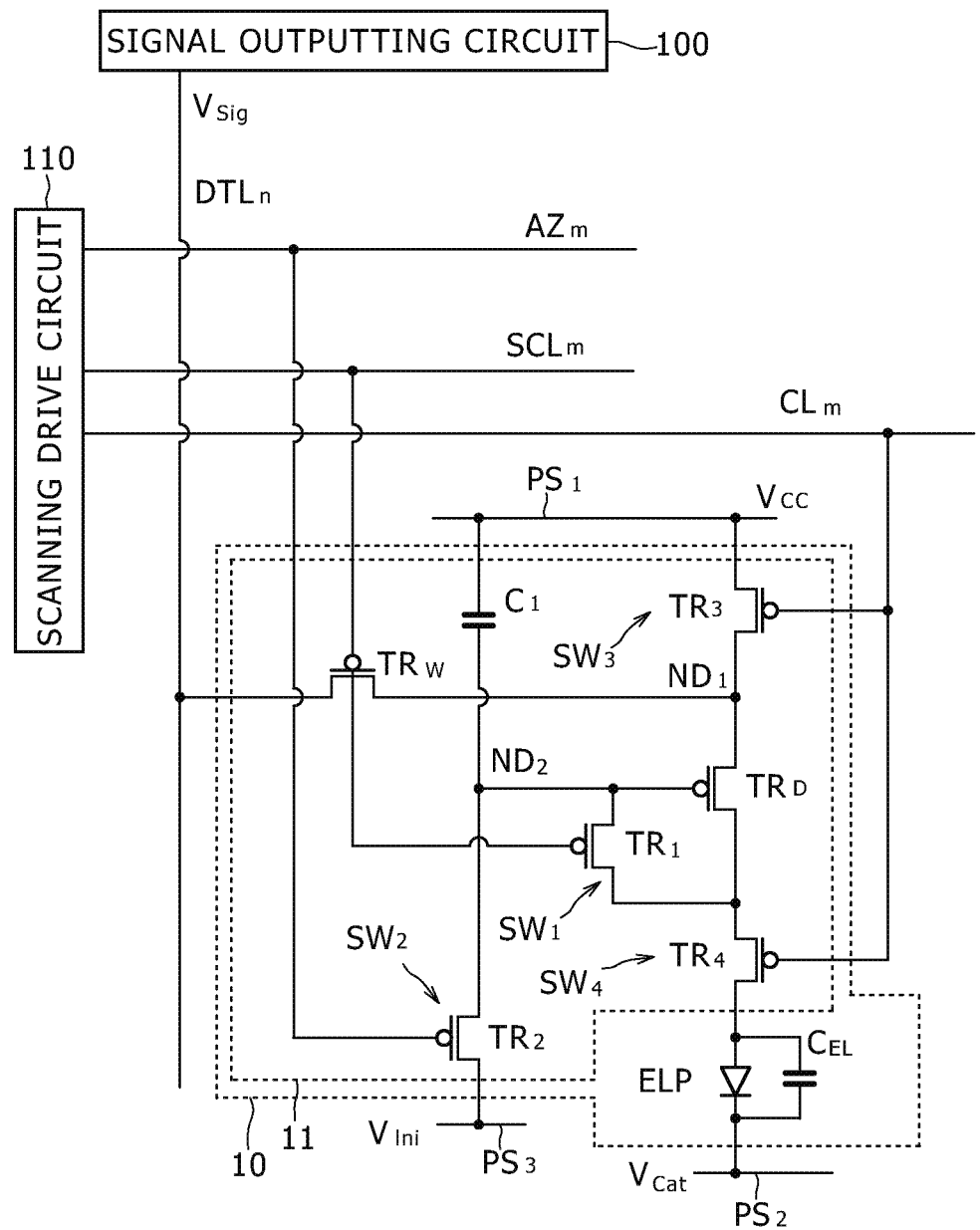
FIG. 4 is an equivalent circuit diagram showing a configuration of a drive circuit composing a display element belonging to an m-th row and an n-th column in the display device shown in FIG. 2.

FIG. 1 is a circuit diagram showing a configuration of the scanning drive circuit 110 of Embodiment 1. FIG. 2 is a conceptual block diagram showing a configuration of the display device 1 of Embodiment 1 including the scanning drive circuit 110 shown in FIG. 1. FIG. 3 is a schematic timing chart explaining an operation of the scanning drive circuit 110 shown in FIG. 1. Also, FIG. 4 is an equivalent circuit diagram of a drive circuit 11 composing a display element 10 belonging to an m-th row (m=1, 2, 3, . . . , M) and an n-th column (n=1, 2, 3, . . . , N) in the display device 1 shown in FIG. 2. Firstly, an outline of the display device 1 will be described.

As shown in FIG. 2, the display device 1 includes:

(1) the display elements 10 two-dimensionally disposed in a matrix;

(2) scanning lines SCL extending in a first direction, initialization control lines AZ through which the display elements 10 are initialized, and display control lines CL through which display states/non-display states of the display elements 10 are controlled;

(3) data lines DTL extending in a second direction different from the first direction; and (4) the scanning drive circuit 110.

The scanning lines SCL, the initialization control lines AZ, and the display control lines CL are each connected to the scanning drive circuit 110. The data lines DTL are connected to a signal outputting circuit 100. It should be noted that although FIG. 2 shows the (3×3) display elements 10 with the display element 10 belonging to the m-th row and the n-th column as a center, this configuration is merely illustrated as an example. In addition, illustrations of power supply lines $PS_1$, $PS_2$ and $PS_3$ shown in FIG. 4 are omitted in FIG. 2.

The N display elements are displayed every row in the first direction, and the M display elements are displayed every column in the second direction different from the first direction. Also, the display device 1 includes {(N/3)×M} pixels two-dimensionally disposed in a matrix. One pixel includes three sub-pixels, that is, a red light emitting sub-pixel for emitting a red light, a green light emitting sub-pixel for emitting a green light, and a blue light emitting sub-pixel for emitting a blue light. The display elements 10 composing the pixels, respectively, are driven in a line-sequential manner, and a display frame rate is FR (times/second). That is to say, the display elements 10 composing (N/3) pixels (N sub-pixels), respectively, disposed in the m-th row are simultaneously driven. In other words, in the display elements 10 composing one row, a timing of light emission/light non-emission thereof is controlled in units of the row to which these display elements 10 belong.

As shown in FIG. 4, each of the display elements 10 includes a drive circuit 11 including a write transistor $TR_W$, a drive transistor $TR_D$, and a capacitor portion $C_1$, and a light emitting portion ELP through which a current is caused to flow via the drive transistor $TR_D$. The light emitting portion ELP is configured in the form of an organic EL light emitting portion. The display element 10 has a structure in which the light emitting portion ELP is laminated above the drive circuit 11. Although the drive circuit 11 further includes a first transistor $TR_1$, a second transistor $TR_2$, a third transistor $TR_3$, and a fourth transistor $TR_4$, the first to fourth transistors $TR_1$, $TR_2$, $TR_3$, and $TR_4$ will be described later.

In the display element 10 belonging to the m-th row and the n-th column, in the write transistor $TR_W$, one source/drain region is connected to a data line $DTL_n$, and a gate electrode is connected to a scanning line $SCL_m$. In the drive transistor $TR_D$, one source/drain region is connected to the other source/drain region of the write transistor $TR_W$, thereby composing a first node $ND_1$. One terminal of the capacitor portion $C_1$ is connected to a power supply line $PS_1$. In the capacitor portion $C_1$, a predetermined reference voltage (a predetermined drive voltage $V_{CC}$ which will be described later in Embodiment 1) is applied to the one terminal, and the other terminal, and a gate electrode of the drive transistor $TR_D$ are connected to each other, thereby composing a second node $ND_2$. The write transistor $TR_W$ is controlled in accordance with a signal supplied from the scanning line $SCL_m$.

A video signal (a drive signal or a luminance signal) $V_{sig}$ in accordance with which a luminance in the light emitting portion ELP is controlled is applied from the signal outputting circuit 100 to the data line $DTL_n$. Details thereof will be described later.

The drive circuit 11 further includes a first switch circuit portion $SW_1$ connected between the second node $ND_2$, and the other source/drain region of the drive transistor $TR_D$. The first switch circuit portion $SW_1$ includes the first transistor $TR_1$. In the first transistor $TR_1$, one source/drain region is connected to the second node $ND_2$, and the other source/drain region is connected to the other source/drain region of the drive transistor $TR_D$. A gate electrode of the first transistor $TR_1$ is connected to the scanning line $SCL_m$, and thus the first transistor $TR_1$ is controlled in accordance with a signal supplied from the scanning line $SCL_m$.

The drive circuit 11 further includes a second switch circuit portion $SW_2$ connected between the second node $ND_2$, and a power source supply line $PS_3$ to which a predetermined initialization voltage $V_{Ini}$ which will be described later is applied. The second switch circuit portion $SW_2$ includes the second transistor $TR_2$. In the second transistor $TR_2$, one source/drain region is connected to a power supply line $PS_3$, and the other source/drain region is connected to the second node $ND_2$. A gate electrode of the second transistor $TR_2$ is connected to the initialization control line $AZ_m$. Thus, the second transistor $TR_2$ is controlled in accordance with a signal supplied from the initialization control line $AZ_m$.

The drive circuit 11 further includes a third switch circuit portion $SW_3$ connected between the first node $ND_1$, and the power supply line $PS_1$ to which the drive voltage $V_{CC}$ is applied. The third switch circuit portion $SW_3$ includes the third transistor $TR_3$. In the third transistor $TR_3$, one source/drain region is connected to the power supply line $PS_1$, and the other source/drain region is connected to the first node $ND_1$. A gate electrode of the third transistor $TR_3$ is connected to the display control line $CL_m$. Thus, the third transistor $TR_3$ is controlled in accordance with a signal supplied from the display control line $CL_m$.

The drive circuit 11 further includes a fourth switch circuit portion $SW_4$ connected between the other source/drain region of the drive transistor $TR_D$, and the one terminal of the light emitting portion ELP. The fourth switch circuit portion $SW_4$ includes the fourth transistor $TR_4$. In the fourth transistor $TR_4$, one source/drain region is connected to the other source/drain region of the drive transistor $TR_D$, and the other source/drain region is connected to the one terminal of the light emitting portion ELP. A gate electrode of the fourth transistor $TR_4$ is connected to the display control line $CL_m$. Thus, the fourth transistor $TR_4$ is controlled in accordance with a signal supplied from the display control line $CL_m$. The other terminal (cathode electrode) of the light emitting portion ELP is connected to the power supply line $PS_2$, and a voltage $V_{cat}$ which will be described later is applied to the other terminal of the light emitting portion ELP. In FIG. 4, reference symbol $C_{EL}$ designates a parasitic capacitance of the light emitting portion ELP.

The drive transistor $TR_D$ is configured in the form of a p-channel TFT, and the write transistor $TR_W$ is also configured in the form of the p-channel TFT. In addition, each of the first transistor $TR_1$, the second transistor $TR_2$, the third transistor $TR_3$, and the fourth transistor $TR_4$ is also configured in the form of the p-channel TFT. It is noted that each of the write transistor $TR_W$ and the like may be configured in the form of an n-channel TFT. Although a description will be given below on the assumption that each of those transistors $TR_1$ to $TR_4$, $TR_D$ and $TR_W$ is of a depletion type, the present invention is by no means limited thereto.

The well known configurations and structures may be adopted as the configurations and structures of the signal outputting circuit 100, the scanning lines SCL, the initialization control lines AZ, the display control lines CL, and the data lines DTL.

The power supply lines $PS_1$, $PS_2$ and $PS_3$ extending in the first direction similarly to the case of the scanning lines SCL are each connected to a power source portion (not shown). The drive voltage $V_{CC}$ is applied to the power supply line $PS_1$, the voltage $V_{cat}$ is applied to the power supply line $PS_2$, and the initialization voltage $V_{Ini}$ is applied to the power supply line $PS_3$. The well known configurations and structures may also be adopted as the configurations and structures of the power supply lines $PS_1$, $PS_2$ and $PS_3$.

Figure 5:
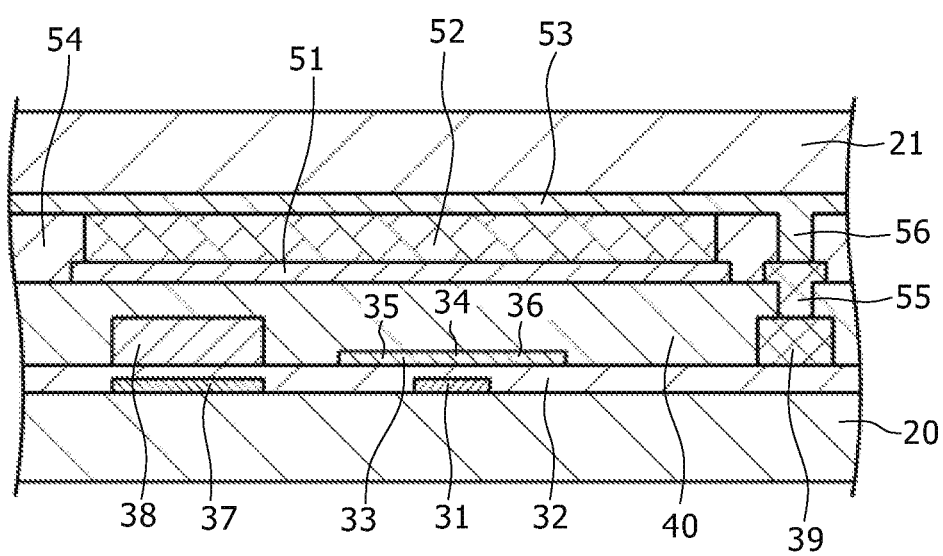
FIG. 5 is a schematic cross sectional view showing a structure of a part of a display element composing the display device shown in FIG. 2.

FIG. 5 is a schematic cross sectional view showing a structure of a part of the display element 10 composing the display device 1 shown in FIG. 2. Although a detailed description will be given later, each of the transistors $TR_1$ to $TR_4$, $TR_D$ and $TR_W$, and the capacitor portion $C_1$ composing the drive circuit 11 of the display element 10 is formed on a supporting body 20, and the light emitting portion ELP, for example, is formed above each of the transistors $TR_1$ to $TR_4$, $TR_D$ and $TR_W$, and the capacitor portion $C_1$ composing the drive circuit 11 through an interlayer insulating layer 40. The light emitting portion ELP has the well known configuration and structure, for example, so as to include an anode electrode, a hole transporting layer, a light emitting layer, an electron transporting layer, a cathode electrode, and the like. It is noted that only the drive transistor $TR_D$ is illustrated in FIG. 5. Other transistors $TR_1$ to $TR_4$, and $TR_W$ are blocked from view. In addition, although the other source/drain region of the drive transistor $TR_D$ is connected to the anode electrode of the light emitting portion ELP through the fourth transistor $TR_4$ (not shown), a connection portion between the fourth transistor $TR_4$, and the anode electrode of the light emitting portion ELP is also blocked from view.

The drive transistor $TR_D$ includes a gate electrode 31, a gate insulating layer 32, and a semiconductor layer 33. More specifically, the drive transistor $TR_D$ includes one source/drain region 35 and the other source/drain region 36 which are provided in the semiconductor layer 33, and a channel formation region 34 to which a portion of the semiconductor layer 33 between one source/drain region 35 and the other source/drain region 36 corresponds. Each of other transistors $TR_1$ to $TR_4$, and $TR_W$ (not shown) has the same structure as that of the drive transistor $TR_D$.

The capacitor portion $C_1$ includes an electrode 37, a dielectric layer including an extension portion of the gate insulating layer 32, and an electrode 38. It is noted that a connection portion between the electrode 37, and the gate electrode 31 of the drive transistor $TR_D$, and a connection portion between the electrode 38 and the power supply line $PS_1$ are each blocked from view.

The gate electrode 31, a part of the gate insulating layer 32, and the electrode 37 composing the capacitor portion $C_1$ are all formed on the supporting body 20. The drive transistor $TR_D$, the capacitor portion $C_1$, and the like are covered with the interlayer insulating layer 40. Also, the light emitting portion ELP including the anode electrode 51, the hole transporting layer, the light emitting layer, the electron transporting layer, and the cathode electrode 53 is provided on the interlayer insulating layer 40. It should be noted that in FIG. 5, the hole transporting layer, the light emitting layer, and the electron transporting layer are collectively illustrated as one layer 52. A second interlayer insulating layer 54 is provided on a portion, of the interlayer insulating layer 40, having no light emitting portion ELP provided thereon, and a transparent substrate 21 is disposed over the second interlayer insulating layer 54 and the cathode electrode 53. Thus, a light emitted from the light emitting layer of the light emitting portion ELP is transmitted through the transparent substrate 21 to be emitted to the outside. The cathode electrode 53, and a wiring 39 composing the power supply line $PS_2$ are connected to each other through contact holes 56 and 55 which are provided in the second interlayer insulating layer 54 and the interlayer insulating layer 40, respectively.

A method of manufacturing the display device shown in FIG. 5 will be described hereinafter. Firstly, the various wirings such as the scanning lines, the electrodes composing the capacitor portion $C_1$, the transistors $TR_1$ to $TR_4$, $TR_D$ and $TR_W$ including the semiconductor layers, the interlayer insulating layer 40, the contact holes 55 and 56, and the like are suitably formed by utilizing the well known methods. Next, the film deposition and the patterning are carried out by utilizing the well known methods, thereby forming the light emitting portions ELP disposed in a matrix. Also, the supporting body 20 and the transparent substrate 21 after completion of the processes described above are made to face each other, and a periphery thereof is sealed. Also, the connection to the signal outputting circuit 100 and the scanning drive circuit 110 is carried out, thereby making it possible to complete the display device.

Next, the scanning drive circuit 110 will be described. Note that, for the sake of convenience of the description, the description of the operation of the scanning drive circuit 110 is given on the assumption that the scanning signals which are supplied to the scanning lines $SCL_1$ to $SCL_{31}$, respectively, are successively generated. This also applies to other embodiments.

As shown in FIG. 1, the scanning drive circuit 110 includes:

(A) a shift register portion 111; and
(B) a logical circuit portion 112.

In this case, the shift register portion 111 includes P stages (P is a natural number of 3 or more, and so forth on) of shift registers $SR_1$ to $SR_P$. The start pulse STP inputted to the shift register portion 111 is successively shifted, and output signals $ST_1$ to $ST_P$ are outputted from the P stages of shift registers $SR_1$ to $SR_P$, respectively. Also, the logical circuit portion 112 operates based on the output signals $ST_1$ to $ST_P$ in the shift register portion 111, and enable signals (a first enable signal $EN_1$, and a second enable signal $EN_2$ which will be described later in Embodiment 1).

When the output signal supplied from the shift register $SR_p$ in the p-th stage (p=1, 2, 3, . . . , P−1, and so forth on) is expressed by $ST_p$, as shown in FIG. 3, commencement of the start pulse STP in the output signal $ST_{p+1}$ supplied from the shift register $SR_{p+1}$ in the (p+1)-th stage is located between commencement and termination of the start pulse STP in the output signal $ST_p$. The shift register portion 111 operates based on the clock signal CK and the start pulse STP so as to fulfill the above condition.

Specifically, the start pulse STP inputted to the shift register $SR_1$ in the first stage is a pulse which rises between the commencement and the termination of the time period $T_1$ shown in FIG. 3, and falls between the commencement and the termination of the time period $T_{29}$. Each of the time periods, such as the time period $T_1$, shown in FIG. 3, and other corresponding figures which will be described later corresponds to one horizontal scanning time period (so-called 1H). The clock signal CK is a rectangular wave-like signal a polarity of which is inverted every two horizontal scanning time periods (2H). The start pulse in the output signal $ST_1$ supplied from the shift register $SR_1$ in the first stage is a pulse which rises at the commencement of the time period $T_3$, and falls at the termination of the time period $T_{30}$. Also, the start pulses in the output signals $ST_2$, $ST_3$, etc. from the shift registers in and after the shift register $SR_2$ in the second stage are pulses which are obtained by successively shifting the original start pulse STP by the two horizontal scanning time periods.

In addition, one first enable signal to one Q-th enable signal (Q is a natural number of 2 or more, and so forth on) exist individually between the commencement of the start pulse STP in the output signal $ST_p$, and the commencement of the start pulse STP in the output signal $ST_{p+1}$. Since Q=2 in Embodiment 1, one first enable signal $EN_1$ and one second enable signal $EN_2$ exist individually between the commencement of the start pulse STP in the output signal $ST_p$, and the commencement of the start pulse STP in the output signal $ST_{p+1}$. In other words, the first enable signal $EN_1$ and the second enable signal $EN_2$ are signals which are generated so as to fulfill the above condition, and are also basically rectangular wave-like signals which have the same period, and are different in phase from each other.

Specifically, the first enable signal $EN_1$ and the second enable signal $EN_2$ are the rectangular wave-like signals each having two horizontal scanning time periods as one period. In Embodiment 1, the first enable signal $EN_1$ and the second enable signal $EN_2$ are inverted in polarities thereof every one horizontal scanning time period, and are 180° out of phase with each other. It should be noted that although each of high levels of the first enable signal $EN_1$ and the second enable signal $EN_2$ are expressed so as to continue for one horizontal scanning time period in FIG. 3, the present invention is by no means limited thereto. That is to say, each of the first enable signal $EN_1$ and the second enable signal $EN_2$ may also be a rectangular wave-like signal a high level of which continues for a time period shorter than one horizontal scanning time period.

For example, one first enable signal $EN_1$ in the time period $T_3$, and one second enable signal $EN_2$ in the time period $T_4$ exist individually between the commencement of the start pulse STP in the output signal $ST_1$ (that is, the commencement of the time period $T_3$), and the commencement of the start pulse STP in the output signal $ST_2$ (that is, the commencement of the time period $T_5$). Similarly, one first enable signal $EN_1$ and one second enable signal $EN_2$ exist individually between the commencement of the start pulse STP in the output signal $ST_2$, and the commencement of the start pulse STP in the output signal $ST_3$. This also applies to any of the output signals in and after the output signal $ST_4$.

As shown in FIG. 1, the logical circuit portion 112 includes $\{(P-2) \times Q\}$ negative AND circuits 113. Specifically, the logical circuit portion 112 includes (1, 1)-th to (P−2, 2)-th negative AND circuits 113.

When a q-th enable signal (q is an arbitrary natural number of 1 to Q, and so forth on) is expressed by $EN_q$, as shown in FIGS. 1 and 3, a (p', q)-th negative AND circuit 113 (p' is an arbitrary natural number of 1 to (P−2), and so forth on) generates a scanning signal based on an output signal $ST_{p'}$, a signal obtained by inverting a polarity of an output signal $ST_{p'+1}$, and the q-th enable signal $EN_q$. More specifically, the output signal $ST_{p'+1}$ is inverted in polarity thereof by a negative AND circuit 114 shown in FIG. 1, and the resulting signal is transmitted to an input side of the (p', q)-th negative AND circuit 113. Also, the output signal $ST_{p'}$ and the q-th enable signal $EN_q$ are directly transmitted to an input side of the (p', q)-th negative AND circuit 113.

As shown in FIG. 1, a signal outputted from a (1, 2)-th negative AND circuit 113 is supplied to a scanning line $SCL_1$ connected to the display element 10 belonging to the first row, and a signal outputted from a (2, 1)-th negative AND circuit 113 is supplied to a scanning line $SCL_2$ connected to the display element 10 belonging to the second row. This also applies to any of other scanning lines SCL. That is to say, a signal outputted from the (p', q)-th negative AND circuit 113 (the case of p'=1 and q=1 is excluded) is supplied to a scanning line $SCL_m$ connected to the display element 10 belonging to the m-th row $\{m=Q \times (p-1)+(q-1)\}$.

Also, in the display element 10 to which the signal based on the scanning signal from the (p', q)-th negative AND circuit 113 is supplied through the scanning line $SCL_m$, when q=1, a signal based on a scanning signal outputted from a (p'−1, q')-th negative AND circuit (q' is one natural number of 1 to Q, and so forth on) is supplied from the initialization control line $AZ_m$ connected to the display element 10 concerned. Also, when q>1, a signal based on a scanning signal from a (p', q")-th negative AND circuit 113 (q" is one natural number of 1 to (q−1), and so forth on) is supplied from the initialization control line $AZ_m$ connected to the display element 10 concerned.

More specifically, in Embodiment 1, in the display element 10 to which the signal based on the scanning signal outputted from the (p', q)-th negative AND circuit 113 is supplied through the scanning line $SCL_m$, when q=1, the signal based on the scanning signal outputted from a (p'−1, q)-th negative AND circuit 113 is supplied from the initialization control line $AZ_m$ connected to the display element 10 concerned. Also, when q>1, a signal based on a scanning signal outputted from a (p', q−1)-th negative AND circuit 113 is supplied from the initialization control line $AZ_m$ connected to the display element 10 concerned.

In addition, when q=1, a signal based on an output signal $ST_{p'+1}$ outputted from a (p'+1)-th shift register $SR_{p'+1}$ is supplied to the display control line $CL_m$ connected to the display element 10 concerned. Also, when q>1, a signal based on an output signal $ST_{p'+2}$ outputted from a (p'+2)-th shift register $SR_{p'+2}$ is supplied to the display control line $CL_m$ connected to the display element 10 concerned. It is noted that since each of the third transistor $TR_3$ and the fourth transistor $TR_4$ shown in FIG. 4 is the p-channel TFT, the signal is supplied to the display control line $CL_m$ through the negative logical circuit 115.

A more detailed description will now be given with reference to FIG. 1. For example, here, attention is paid to the display element 10 to which a signal based on a scanning signal outputted from a (5, 1)-th negative AND circuit 113 is supplied through a scanning line $SCL_8$. In this case, a signal based on a scanning signal outputted from a (4, 2)-th negative AND circuit 113 is supplied to an initialization control line $AZ_8$ connected to the display element 10 concerned. Also, a signal based on an output signal $ST_6$ from a sixth shift register $SR_6$ is supplied to a display control line $CL_8$ connected to the display element 10 concerned. In addition, here, attention is paid to the display element 10 to which a signal based on a scanning signal outputted from a (5, 2)-th negative AND circuit 113 is supplied through a scanning line $SCL_9$. In this case, a signal based on a scanning signal outputted from a (5, 1)-th negative AND circuit 113 is supplied to an initialization control line $AZ_9$ connected to the display element 10 concerned. Also, a signal based on an output signal $ST_7$ from a seventh shift register $SR_7$ is supplied to a display control line $CL_9$ connected to the display element 10 concerned.

Next, an operation of the display device 1 will be described in relation to an operation of the display element 10, belonging to the m-th row and the n-th column, to which the signal outputted from the (p', q)-th negative AND circuit 113 is supplied through the scanning line $SCL_m$. The display element 10 concerned will be referred below to as "the (n, m)-th display element 10" or "the (n, m)-th sub-pixel." In addition, the horizontal scanning time period for the display elements 10 disposed in the m-th row (more specifically, the m-th horizontal scanning time period in the current display frame) will be simply referred below to as "the m-th horizontal scanning time period." This also applies to Embodiment 2 which will be described later.

Figure 6:
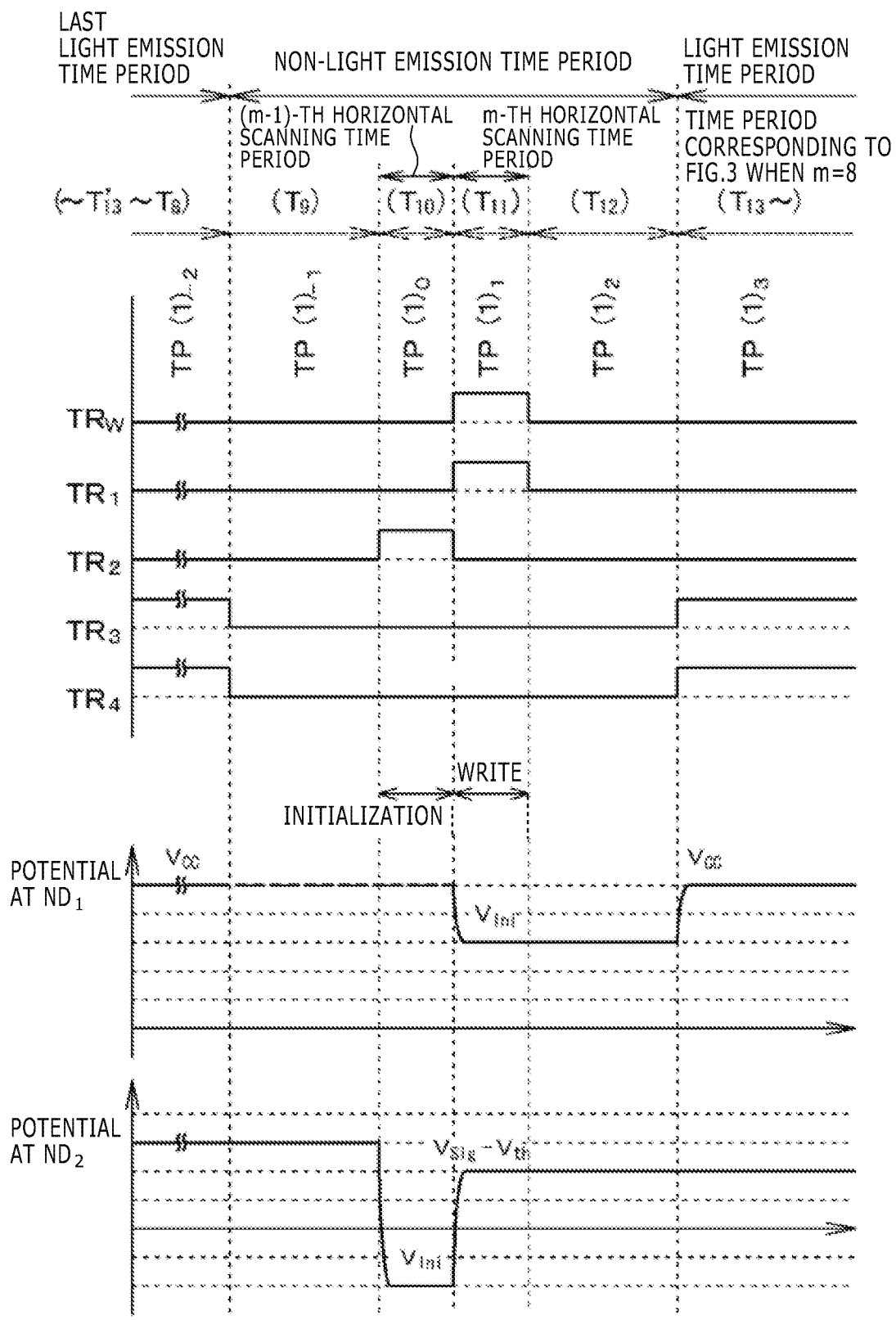
FIG. 6 is a schematic timing chart explaining an operation for driving the display element belonging to the m-th row and the n-th column.

FIG. 6 is a schematic timing chart explaining an operation for driving the display element 10 belonging to the m-th row and the n-th column. FIGS. 7A to 7F are respectively equivalent circuit diagrams schematically showing ON/OFF states and the like of the first to fourth transistors $TR_1$ to $TR_4$, the drive transistor $TR_D$, and the write transistor $TR_W$ in the drive circuit 11 composing the display element 10 belonging to the m-th row and the n-th column.

Note that, when the schematic timing chart shown in FIG. 6 is compared with the schematic timing chart shown in FIG. 3, for the sake of convenience of the description, reference is made to the timing chart of the initialization control line $AZ_8$, the scanning line $SCL_8$, and the display control line $CL_8$ shown in FIG. 3 on the assumption that, for example, p'=5 and q=1, and m=8.

In the light emission state of the display element 10, the drive transistor $TR_D$ is driven so as to cause the drain current $I_{ds}$ to flow through the light emitting portion ELP in accordance with Expression (5):

$$I_{ds}=k\cdot\mu\cdot(V_{gs}-V_{th})^2 \quad (5)$$

where μ is an effective mobility, $V_{gs}$ is a voltage developed across the source region and the gate electrode of the drive transistor $TR_D$, and k is a constant.

Here, the constant k is given by Expression (6):

$$k=(½)\cdot(W/L)\cdot C_{ox} \quad (6)$$

where L is a channel length, W is a channel width, and Cox=(relative permeability of gate insulating layer)×(permittivity of vacuum)/(thickness of gate insulating layer).

In the light emission state of the display element 10, one source/drain region of the drive transistor $TR_D$ functions as the source region, and the other source/drain region thereof functions as the drain region. For the sake of convenience of the description, in the following description, one source/drain region of the drive transistor $TR_D$ will be simply referred below to as "the source region," and the other source/drain region thereof will be simply referred below to as "the drain region" in some cases.

Although in the description of Embodiment 1, and Embodiment 2 which will be described later, values of the voltages or potentials are set as follows, these values are merely values for the description, and thus the present invention is by no means limited thereto.

$V_{sig}$: the video signal in accordance with which the luminance in the light emitting portion ELP
  0 V (maximum luminance) to 8 V (minimum luminance)
$V_{CC}$: the drive voltage
  10 V
$V_{Ini}$: the initialization voltage in accordance with which the potential at the second node $ND_2$ is initialized
  −4 V
$V_{th}$: the threshold voltage of the drive transistor $TR_D$
  2 V
$V_{cat}$: the voltage applied to the power supply line $PS_2$
  −10 V

Figure 7A:
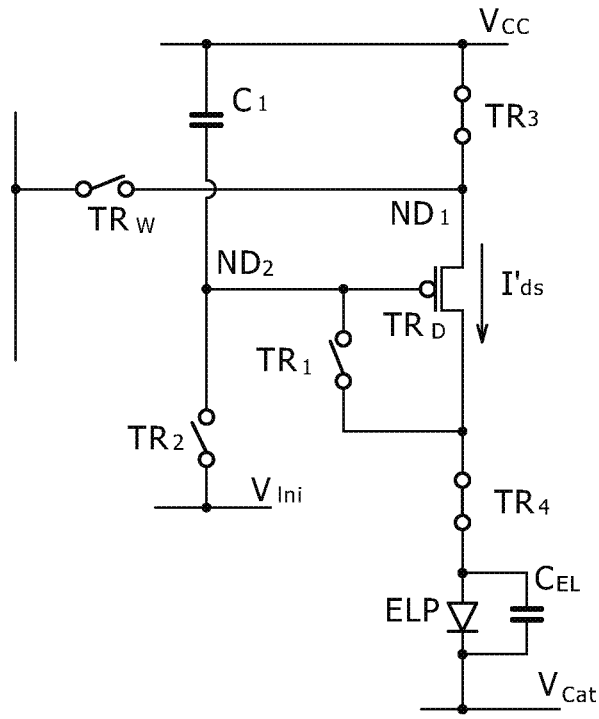
FIGS. 7A to 7F are respectively equivalent circuit diagrams schematically showing ON/OFF states and the like of transistors in the drive circuit composing the display element belonging to the m-th row and the n-th column.
Figure 7B:
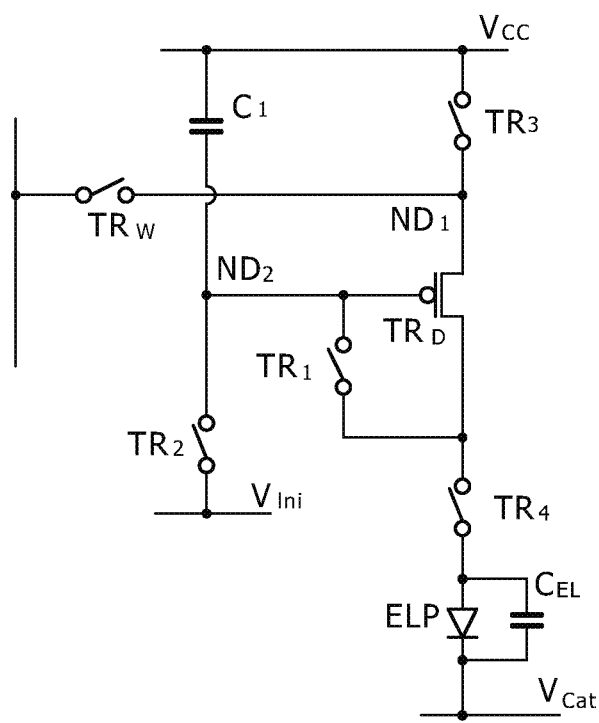

[Time Period-TP(1)$_{-2}$] (Refer to FIGS. 6 and 7A)

[Time Period-TP(1)$_{-2}$] is a time period for which the (n, m)-th display element 10 is in the light emission state in response to the video signal $V_{sig}$ formerly written. For example, when m=8, [Time Period-TP(1)$_{-2}$] corresponds to a time period up to the termination of the time period $T_8$ shown in FIG. 3. Each of the potentials of the initialization control line $AZ_8$ and the scanning line $SCL_8$ is held at the high level, and the potential of the light emission control line $CL_8$ is held at the low level.

Therefore, each of the write transistor $TR_W$, the first transistor $TR_1$, and the second transistor $TR_2$ is held in the OFF state. Each of the third transistor $TR_3$ and the fourth transistor $TR_4$ is held in the ON state. A drain current $I'_{ds}$ based on Expression (5) which will be expressed later is caused to flow through the light emitting portion ELP in the display element 10 composing the (n, m)-th sub-pixel. Also, the luminance of the display element 10 composing the (n, m)-th sub-pixel is a value corresponding to the drain current $I'_{ds}$ concerned. [Time Period-TP(1)$_{-1}$] (refer to FIGS. 6 and 7B)

The display element 10 composing the (n, m)-th sub-pixel is held in the non-light emission state for a time period from [Time Period-TP(1)$_{-1}$] to [Time Period-TP(1)$_2$] which will be described later. The termination of [Time Period-TP(1)$_{-1}$] is termination of an (m−2)-th horizontal scanning time period in the current display frame. For example, when m=8, [Time Period-TP(1)$_{-1}$] corresponds to the time period T$_9$ shown in FIG. 3. Each of the potentials of the initialization control line AZ$_8$ and the scanning line SCL$_8$ is held at the high level, and the potential of the light emission control line CL$_8$ becomes the high level.

Therefore, each of the write transistor TR$_W$, the first transistor TR$_1$, and the second transistor TR$_2$ is held in the OFF state. Each of the third transistor TR$_3$ and the fourth transistor TR$_4$ is changed from the ON state to the OFF state. As a result, the first node ND$_1$ is separated from the power supply line PS$_1$, and the light emission portion ELP and the drive transistor TR$_D$ are separated from each other. Therefore, no current is caused to flow through the light emitting portion ELP, so that the light emitting portion ELP becomes the non-light emission state.

Figure 7C:
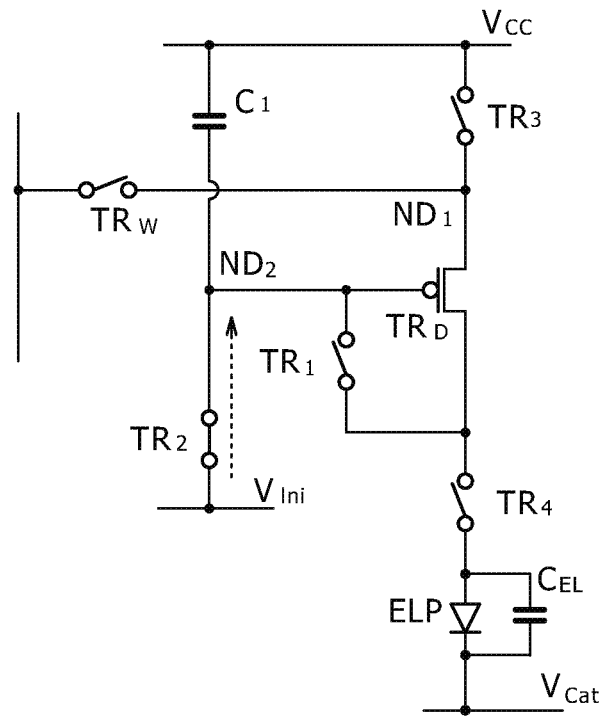

[Time Period-TP(1)$_0$] (Refer to FIGS. 6 and 7C)

[Time Period-TP(1)$_0$] is the (m−1)-th horizontal scanning time period in the current display frame. For example, when m=8, [Time Period-TP(1)$_0$] corresponds to the time period T$_{10}$ shown in FIG. 3. Each of the potentials of the scanning line SCL$_8$ and the light emission control line CL$_8$ is held at the high level. The potential of the initialization control line AZ$_8$ becomes the high level at the termination of the time period T$_{10}$ after having become the low level.

For [Time Period-TP(1)$_0$], each of the first switch circuit portion SW$_1$, the third switch circuit portion SW$_3$, and the fourth switch circuit portion SW$_4$ is held in the OFF state. After the predetermined initialization voltage V$_{Ini}$ is applied from the power supply line PS$_3$ to the second node ND$_2$ through the second switch circuit portion SW$_2$ held in the ON state, the second switch circuit portion SW$_2$ is turned OFF, thereby setting the potential at the second node ND$_2$ at the predetermined reference potential. In the manner as described above, the initialization processing is executed.

That is to say, each of the write transistor TR$_W$, the first transistor TR$_1$, the third transistor TR$_3$, and the fourth transistor TR$_4$ is held in the OFF state. The second transistor TR$_2$ is changed from the OFF state to the ON state, so that the predetermined initialization voltage V$_{Ini}$ is applied from the power supply line PS$_3$ to the second node ND$_2$ through the second transistor TR$_2$ held in the ON state. Also, the second transistor TR$_2$ is turned OFF at the termination of [Time Period-TP(1)$_0$]. Since the drive voltage V$_{CC}$ is applied to one terminal of the capacitor portion C$_1$, and thus the potential at one terminal of the capacitor portion C$_1$ is held, the potential at the second node ND$_2$ is set at the predetermined reference potential (−4 V) in accordance with the initialization voltage V$_{Ini}$.

Figure 7D:
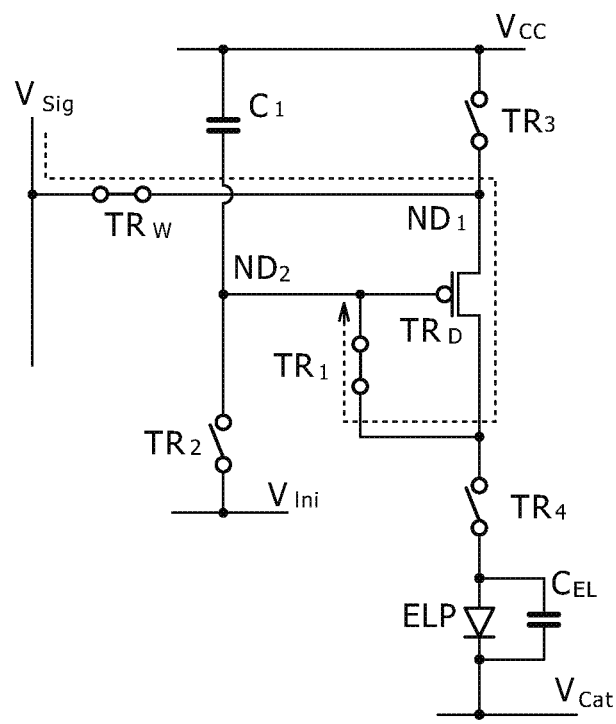

[Time Period-TP(1)$_1$] (Refer to FIGS. 6 and 7D)

[Time Period-TP(1)$_1$] is the m-th horizontal scanning time period in the current display frame. For example, when m=8, [Time Period-TP(1)$_1$] corresponds to the time period T$_{11}$ shown in FIG. 3. Each of the potentials of the initialization control line AZ$_8$ and the light emission control line CL$_8$ is held at the high level, and the potential of the scanning line SCL$_8$ becomes the low level.

For [Time Period-TP(1)$_1$], each of the second switch circuit SW$_2$, the third switch circuit portion SW$_3$, and the fourth switch circuit portion SW$_4$ is held in the OFF state, and the first switch circuit portion SW$_1$ is turned ON. In a state in which the second node ND$_2$, and the other source/drain region of the drive transistor TR$_D$ are electrically connected to each other through the first switch circuit portion SW$_1$ held in the ON state, the video signal V$_{sig}$ is applied from the data line DTL$_n$ to the first node ND$_1$ through the write transistor TR$_W$ held in the ON state in accordance with the signal supplied from the scanning line SCL$_m$. As a result, the potential at the second node ND$_2$ is changed toward a potential obtained by subtracting the threshold voltage V$_{th}$ of the drive transistor TR$_D$ from the potential of the video signal V$_{sig}$. In the manner as described above, the writing process is carried out.

That is to say, each of the second transistor TR$_2$, the third transistor TR$_3$, and the fourth transistor TR$_4$ is held in the OFF state. Each of the write transistor TR$_W$ and the first transistor TR$_1$ is turned ON in accordance with the signal supplied from the scanning line SCL$_m$. Also, the second node ND$_2$, and the other source/drain region of the drive transistor TR$_D$ are electrically connected to each other through the first transistor TR$_1$ held in the ON state. In addition, the video signal V$_{sig}$ is applied from the data line DTL$_n$ to the first node ND$_1$ through the write transistor TR$_W$ held in the ON state. As a result, the potential at the second node ND$_2$ is changed toward a potential obtained by subtracting the threshold voltage V$_{th}$ of the drive transistor TR$_D$ from the potential of the video signal V$_{sig}$.

That is to say, by carrying out the initializing process described above, the potential at the second node ND$_2$ is initialized so that the drive transistor TR$_D$ is turned ON at the commencement of [Time Period-TP(1)$_1$]. Therefore, the potential at the second node ND$_2$ changes toward the potential of the video signal V$_{sig}$ applied to the first node ND$_1$. However, when a difference in potential between the gate electrode and one source/drain region of the drive transistor TR$_D$ reaches the threshold voltage V$_{th}$ thereof, the drive transistor TR$_D$ is turned OFF. In this state, the potential at the second node ND$_2$ is approximately expressed by (V$_{sig}$−V$_{th}$). A potential V$_{ND2}$ at the second node ND$_2$ is expressed by Expression (7):

$$V_{ND2} \approx (V_{sig} - V_{th}) \qquad (7)$$

Each of the write transistor TR$_W$ and the first transistor TR$_1$ is turned OFF in accordance with the signal supplied from the scanning line SCL$_m$ before the (m+1)-th horizontal scanning time period starts.

Figure 7E:
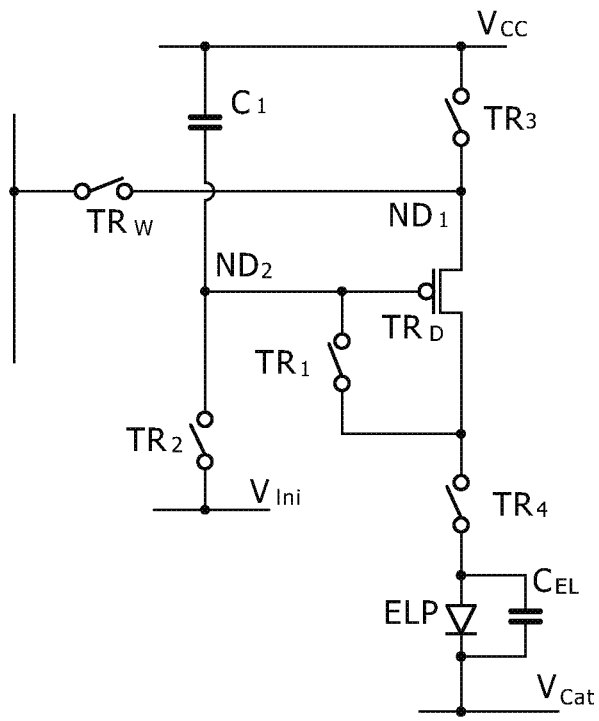

[Time Period-TP(1)$_2$] (Refer to FIGS. 6 and 7E)

For [Time Period-TP(1)$_2$] is a time period up to start of the light emission time period after completion of the writing process, and the (n, m)-th display element 10 is in a non-light emission state. For example, when m=8, [Time Period-TP(1)$_2$] corresponds to the time period T$_{12}$ shown in FIG. 3. The potential of the scanning line SCL$_8$ becomes the high level, and each of the potentials of the initialization line AZ$_8$ and the light emission control line CL$_8$ is held at the high level.

That is to say, each of the write transistor TR$_W$ and the first transistor TR$_1$ is turned OFF, and each of the second transistor TR$_2$, the third transistor TR$_3$, and the fourth transistor TR$_4$ is held in the OFF state. The first node ND$_1$ is kept being separated from the power supply line PS$_1$, and the light emitting portion ELP and the drive transistor TR$_D$ are kept being separated from each other. Also, the potential V$_{ND2}$ at the second node ND$_2$ is held so as to fulfill Expression (7).

Figure 7F:
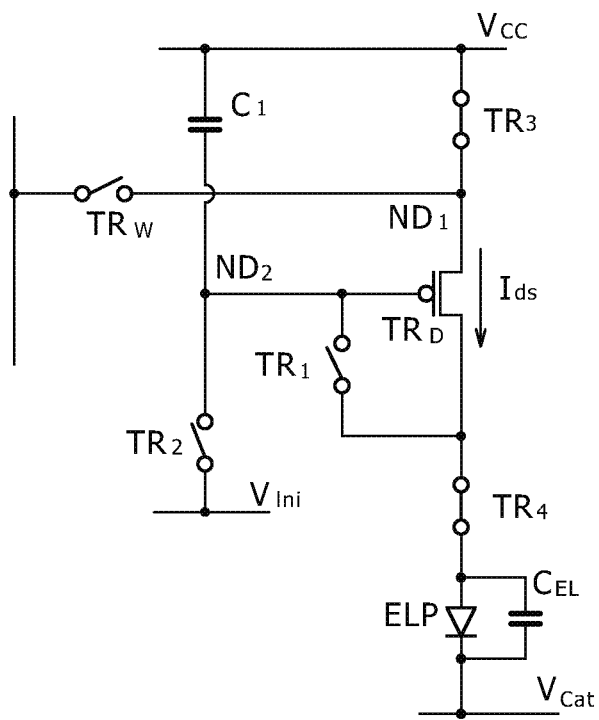

[Time Period-TP(1)$_3$] (Refer to FIGS. 6 and 7F)

For [Time Period-TP(1)$_3$], each of the first switch circuit portion SW$_1$ and the second switch circuit portion SW$_2$ is held in the OFF state. The other source/drain region of the drive transistor TR$_D$, and one terminal of the light emitting portion ELP are electrically connected to each other through the fourth switch circuit portion SW$_4$ held in the ON state. Also, the predetermined drive voltage V$_{CC}$ is applied from the power supply line PS$_1$ to the first node ND$_1$ through the third switch circuit portion SW$_3$ held in the ON state. As a result, the drain current $I_{ds}$ is caused to flow through the light emission portion ELP through the drive transistor $TR_D$, thereby driving the light emission portion ELP. In the manner as described above, the light emission process is carried out.

For example, when m=8, [Time Period-TP(1)$_3$] corresponds to a time period from the commencement of the time period $T_{13}$ shown in FIG. 3 to the termination of the time period $T_8$ in the next frame. Each of the potentials of the initialization control line $AZ_8$ and the scanning line $SCL_8$ is held at the high level, and the potential of the display control line $CL_8$ becomes the low level.

That is to say, each of the first transistor $TR_1$ and the second transistor $TR_2$ is held in the OFF state, and each of the third transistor $TR_3$ and the fourth transistor $TR_4$ is changed from the OFF state to the ON state in accordance with a signal supplied from the display control line $CL_m$. The predetermined drive voltage $V_{CC}$ is applied to the first node $ND_1$ through the third transistor $TR_3$ held in the ON state. In addition, the other source/drain region of the drive transistor $TR_D$, and one terminal of the light emitting portion ELP are electrically connected to each other through the fourth transistor $TR_4$ held in the ON state. As a result, the drain current $I_{ds}$ is caused to flow through the light emitting portion ELP via the drive transistor $TR_D$, thereby driving the light emitting portion ELP.

Also, Expression (8) is obtained as follows based on Expression (7):

$$V_{gs} \approx V_{CC} - (V_{sig} - V_{th}) \quad (8)$$

Therefore, Expression (5) can be transformed into Expression (9):

$$\begin{aligned} I_{ds} &= k \cdot \mu \cdot (V_{gs} - V_{th})^2 \\ &= k \cdot \mu \cdot (V_{CC} - V_{sig})^2 \end{aligned} \quad (9)$$

Therefore, the drain current $I_{ds}$ caused to flow through the light emitting portion ELP is proportional to a square of a value of a potential difference between the drive voltage $V_{CC}$ and the video signal $V_{sig}$. In other words, the drain current $I_{ds}$ caused to flow through the light emitting portion ELP does not depend on the threshold voltage $V_{th}$ of the drive transistor $TR_D$. That is to say, an amount of luminescence (luminance) of the light emitting portion ELP is free from an influence of the threshold voltage $V_{th}$ of the drive transistor $TR_D$. Also, the luminance of the (n, m)-th display element 10 is a value corresponding to the drive current $I_{ds}$.

The light emission state of the light emitting portion ELP continues up to a time period corresponding to the termination of [Time Period-TP(1)$_{-2}$] in the next frame.

The operation for the light emission of the display element 10 composing the (n, m)-th sub-pixel is completed through the processes described above.

The lengths of the non-light emission time periods are identical to one another irrespective of the value of m. However, a rate of occupation of [Time Period-TP(1)$_{-1}$] and [Time Period-TP(1)$_2$] in the non-light emission time period changes depending on the value of m. This also applies to Embodiment 2 which will be described later. For example, [Time Period-TP(1)$_{-1}$] does not exist in the timing chart of the signals on the scanning lines $SCL_C$ and the like shown in FIG. 3. It should be noted that even when there is no [Time Period-TP(1)$_{-1}$], there is no particular obstacle in the operation of the display device 1.

The scanning drive circuit 110 of Embodiment 1 is a circuit, having an integrated configuration, for supplying the signals to the scanning lines SCL, the initialization control lines AZ, and the display control lines CL, respectively. As a result, it is possible to realize the reduction of the layout area occupied by the circuits, and the reduction of the circuit cost.

In the display device 1 including the scanning drive circuit 110 of Embodiment 1, even when the termination of the start pulse STP shown in FIG. 3 is changed, the signals applied to the initialization control lines AZ and the scanning lines SCL, respectively, are free from an influence of the change in termination of the start pulse STP. A description thereof will now be given with reference to FIGS. 3, 8 and 9.

Figure 8:
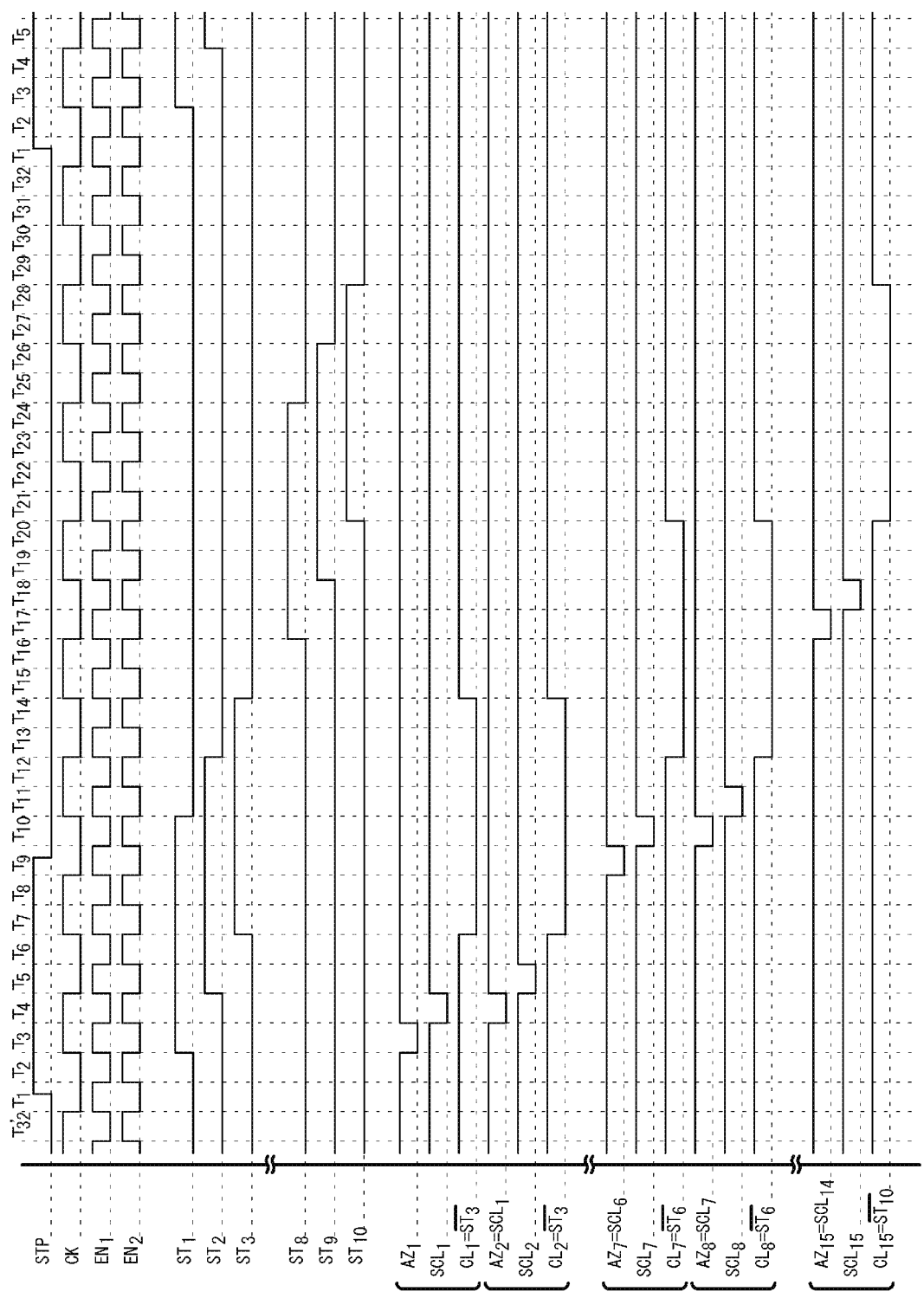
FIG. 8 is a schematic timing chart explaining an operation of the scanning drive circuit of Embodiment 1 when a timing of falling of a start pulse is changed.

Referring to FIG. 3, the start pulse STP is the pulse which rises between the commencement and the termination of the time period $T_1$, and falls between the commencement and the termination of the time period $T_{29}$. FIG. 8 is a schematic timing chart explaining an operation of the scanning drive circuit 110 when the timing at which the start pulse STP falls is changed. Specifically, that timing, for example, is changed in a way that the start pulse STP falls between the commencement and the termination of the time period $T_9$.

As described above, in the scanning drive circuit 110, the (p', q)-th negative AND circuit generates the scanning signal based on the output signal $ST_{p'}$, the signal obtained by inverting the polarity of the output signal $ST_{p'+1}$, and the q-th enable signal $EN_q$. Therefore, even when the falling of the start pulse STP is changed, the signals applied to the initialization control lines AZ, and the scanning lines SCL, respectively, are the same as those shown in FIG. 3. As apparent from comparison of the schematic timing chart shown in FIG. 8 with the schematic timing chart shown in FIG. 3, only the waveform of the signals supplied to the display control lines CL, respectively, change in the case of the schematic timing chart shown in FIG. 8.

Figure 9:
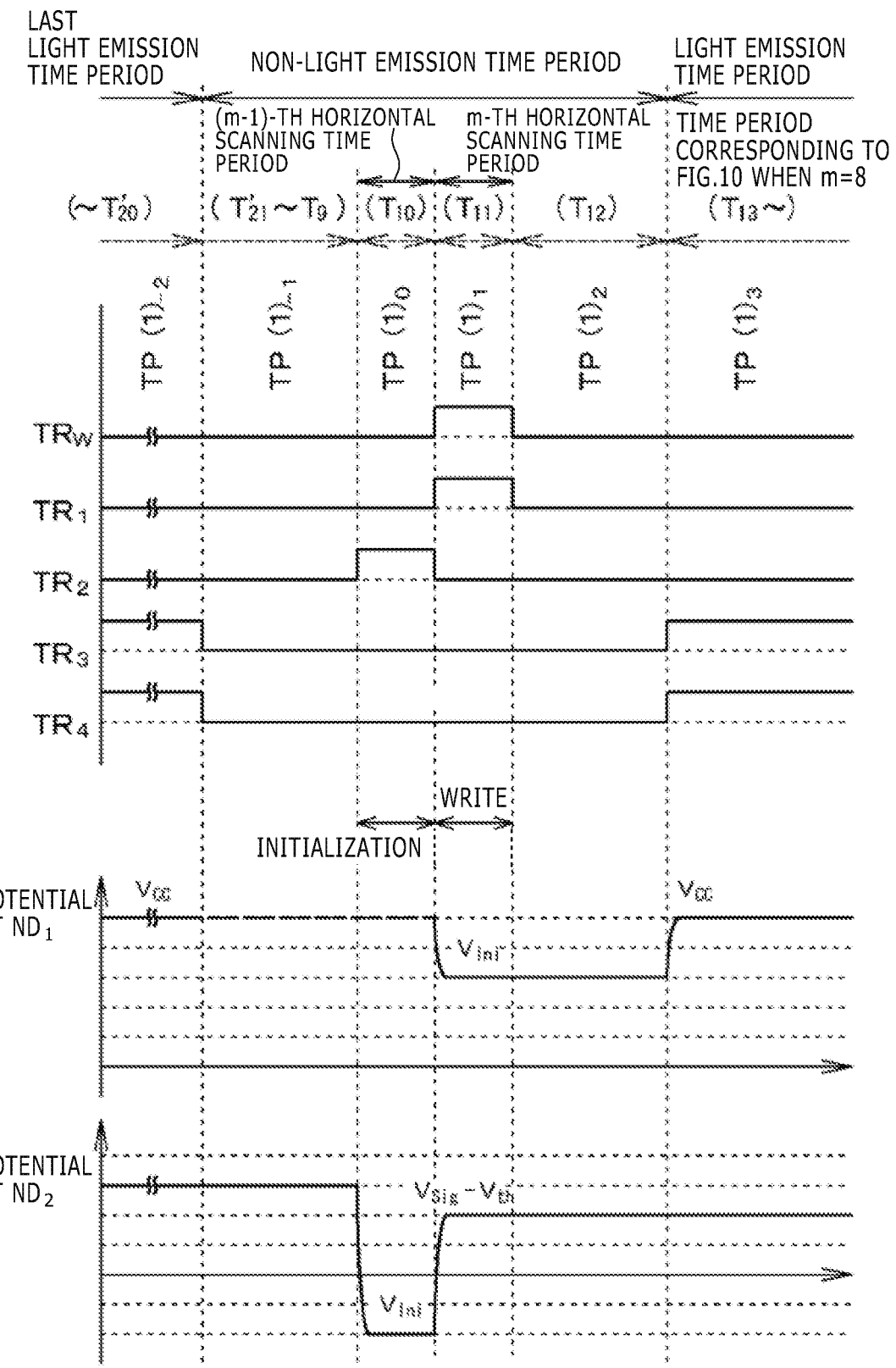
FIG. 9 is a schematic timing chart explaining an operation of the display element belonging to the m-th row and the n-th column on the assumption that the start pulse rises between commencement and termination of a time period $T_9$.

FIG. 9 corresponds to FIG. 6, and is a schematic timing chart explaining an operation for driving the display element 10 belonging to the m-th row and the n-th column when the start pulse STP falls between the commencement and the termination of the time period $T_9$. In the display device 1, the time period for which each of the potentials of the display control lines CL is held at the high level is the non-light emission time period shown in FIG. 6 or FIG. 8. For example, in FIG. 6, when m=8, the non-light emission time period ranges from the time period $T_9$ to the time period $T_{12}$. On the other hand, in FIG. 9, the non-light emission time period ranges from the previous time period $T'_{21}$ to the time period $T_{12}$. By adopting the easy method of changing the width of the start pulse STP in the manner as described above, the setting of the widths of the pulses supplied to the display control lines CL, respectively, can be readily changed without exerting an influence on the signals supplied to the scanning lines SCL and the initialization control lines AZ, respectively.

Figure 10:
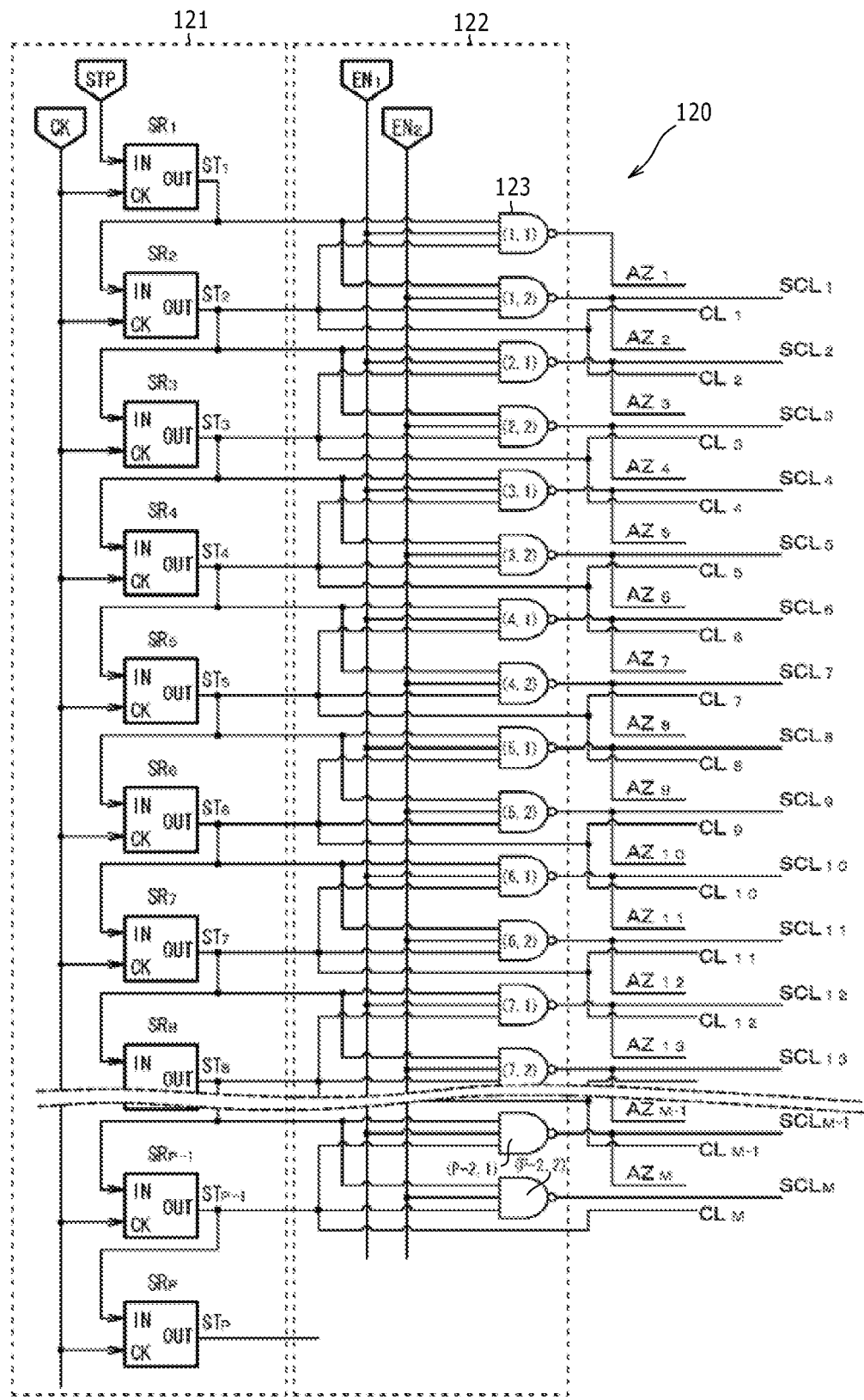
FIG. 10 is a circuit diagram showing a configuration of a scanning drive circuit according to Comparative Example of Embodiment 1.

A description will be further given in contrast with Comparative Example. FIG. 10 is a circuit diagram of a scanning drive circuit 120 of Comparative Example. In the scanning drive circuit 120, the configuration of a logical circuit portion 122 is different from that of the logical circuit portion 112 of the scanning drive circuit 110 of Embodiment 1. A configuration of a shift register portion 121 of the scanning drive circuit 120 is the same as that of the shift register 111 of the scanning drive circuit 110.

More specifically, in the scanning drive circuit 120 of Comparative Example, the negative logical circuits 114 and 115 shown in FIG. 1 are both omitted. In addition, when q=1, a signal based on an output signal $ST_{p'}$ outputted from the p'-th shift register $SR_{p'}$ is supplied to the display element 10 to which the signal based on the scanning signal outputted from the (p', q)-th negative AND circuit 123 is supplied through the corresponding one, of the display control lines CL, connected to the display element 10. Also, when q>1, a signal based on an output signal $ST_{p'+1}$ from the (p'+1)-th shift register $SR_{p'+1}$ is supplied to the display element 10 concerned.

In the scanning drive circuit 120 having the configuration described above, a (p', q)-th negative AND circuit 123 generates the scanning signal based on the output signal $ST_{p'}$, the output signal $ST_{p'+1}$, and the q-th enable signal $EN_q$. Therefore, when a plurality of q-th enable signals $EN_q$ exist within a time period for which the start pulse of the output signal $ST_{p'}$, and the start pulse of the output signal $ST_{p'+1}$ overlap each other, a plurality of scanning signals are generated for the overlapping time period. For this reason, if the start pulse STP rises between the commencement and the termination of the time period $T_1$, the start pulse STP needs to be set so as to fall between the commencement and the termination of the time period $T_5$.

Figure 11:
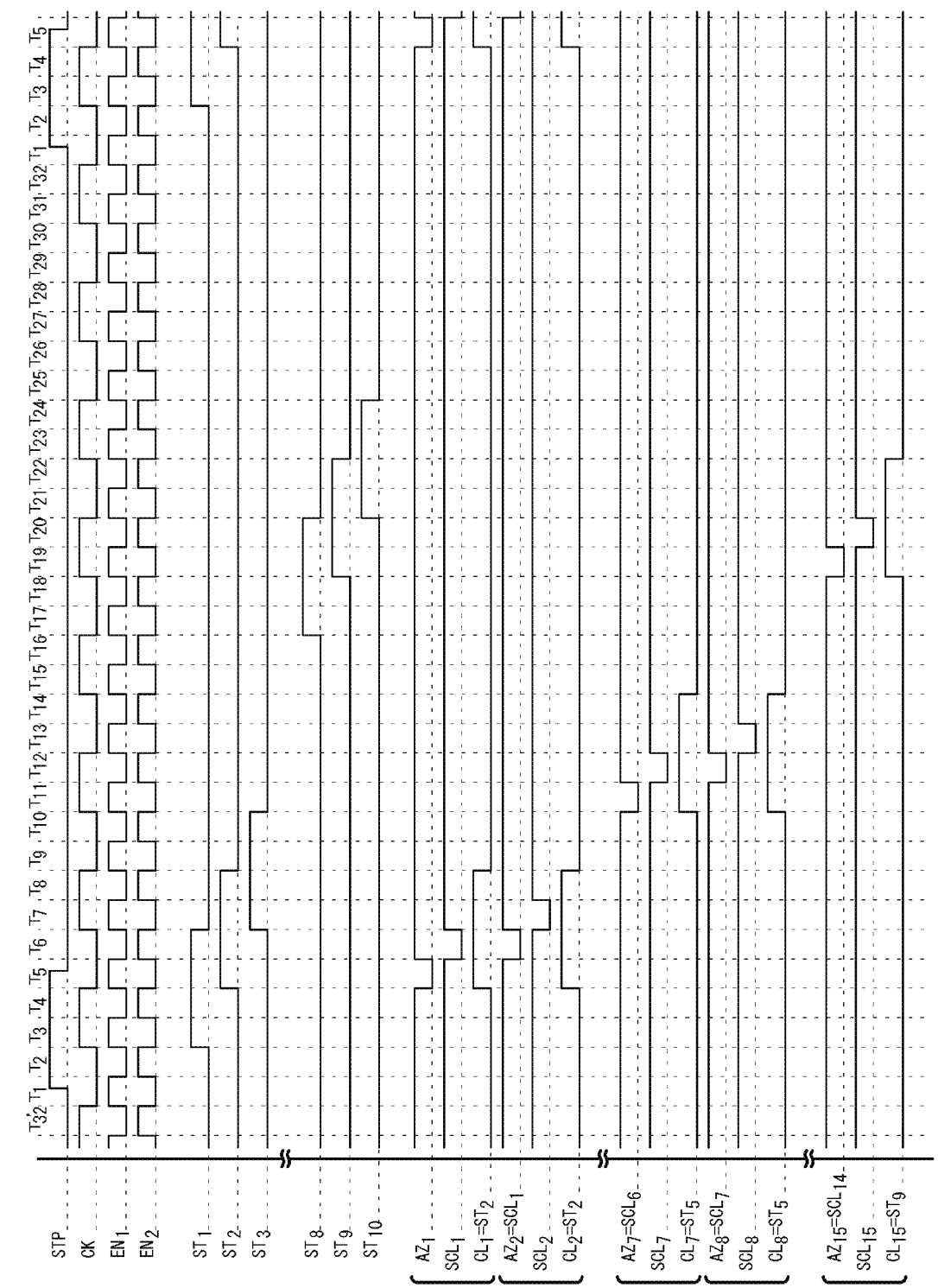
FIG. 11 is a schematic timing chart explaining an operation of the scanning drive circuit of Comparative Example shown in FIG. 10 when a start pulse rises between commencement and termination of a time period $T_1$, and falls between commencement and termination of a time period $T_5$.

FIG. 11 is a schematic timing chart explaining an operation of the scanning drive circuit 120 shown in FIG. 10 when the start pulse STP rises between the commencement and the termination of the time period $T_1$, and falls between the commencement and the termination of the time period $T_5$. As apparent from comparison of the schematic timing chart shown in FIG. 11 with the schematic timing chart shown in FIG. 3, although there are phase shifts in the signals, the same signals as those shown in FIG. 3 are supplied to the initialization control lines AZ, the scanning lines SCL, and the display control lines CL, respectively.

Figure 12:
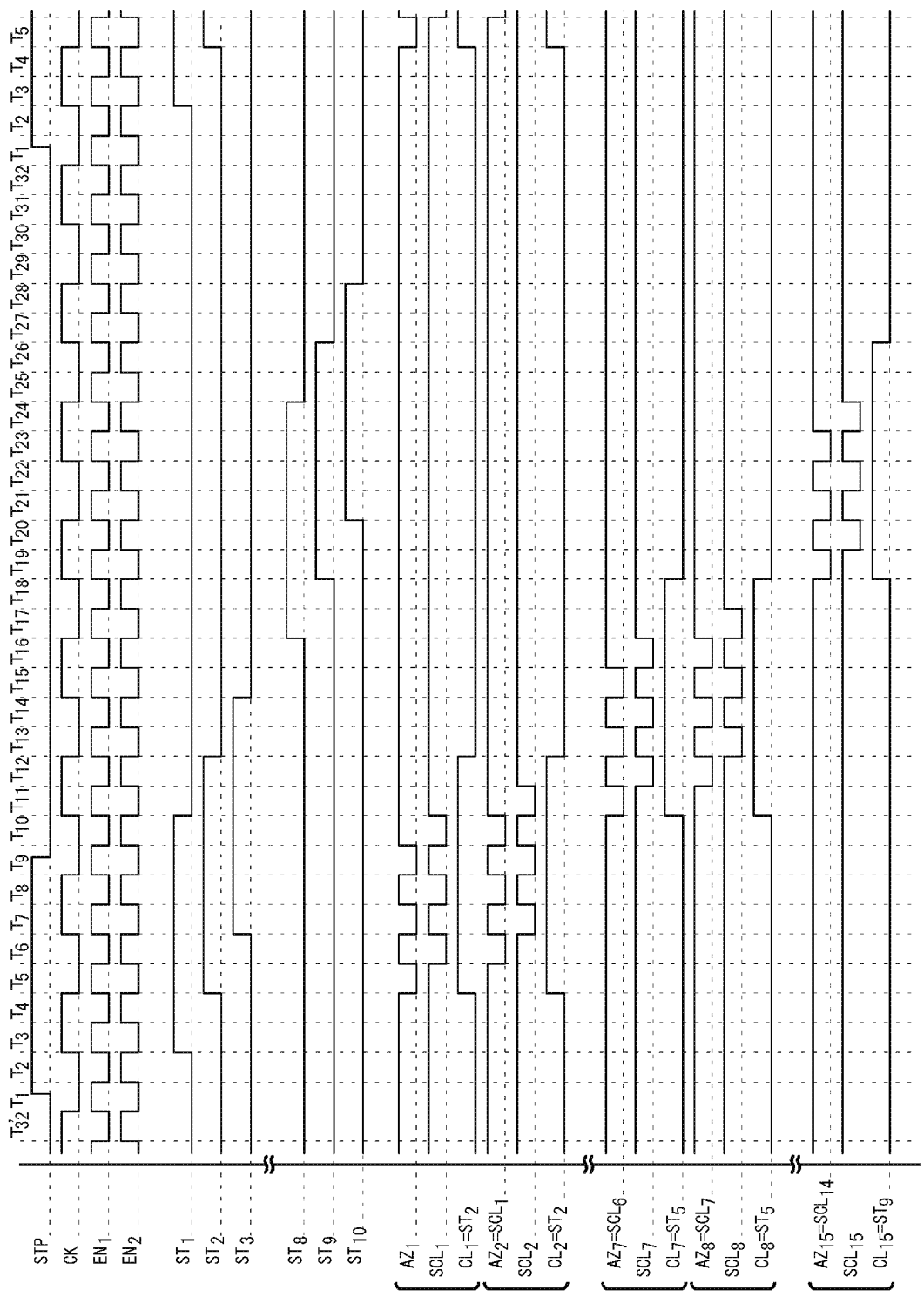
FIG. 12 is a schematic timing chart explaining an operation of the scanning drive circuit of Comparative Example shown in FIG. 10 when the start pulse falls between commencement and termination of a time period $T_9$.

Next, FIG. 12 shows a schematic timing chart explaining an operation of the scanning drive circuit 120 when, for example, the start pulse STP falls between the commencement and the termination of the time period $T_9$. In this case, a plurality of scanning signals are generated for the time period for which the start pulse of the output signal $ST_{p'}$, and the start pulse of the output signal $ST_{p'+1}$ overlap each other. As has been described above, in the scanning drive circuit 120 of Comparative Example, the changing of the width of the start pulse STP exerts an influence on the signals supplied to the scanning lines SCL and the initialization control line AZ, respectively, and affects the operation of the display device.

As has been described, in the scanning drive circuit 120 of Comparative Example, the changing of the width of the start pulse STP may make it impossible to change the widths of the pulses supplied to the display control lines CL, respectively. However, there is no such a limit to the scanning drive circuit 110 of Embodiment 1.

Embodiment 2

A scanning drive circuit and a display device including the same according to the present invention will be described in detail hereinafter based on Embodiment 2. As shown in FIG. 2, the display device 2 of Embodiment 2 has the same configuration as that of the display device 1 of Embodiment 1 except that a scanning drive circuit 210 of the display device 2 of Embodiment 2 is different in configuration from the scanning drive circuit 110 of the display device 1 of Embodiment 1. Therefore, a description of the display device 2 is omitted in Embodiment 2 for the sake of simplicity.

Figure 13:
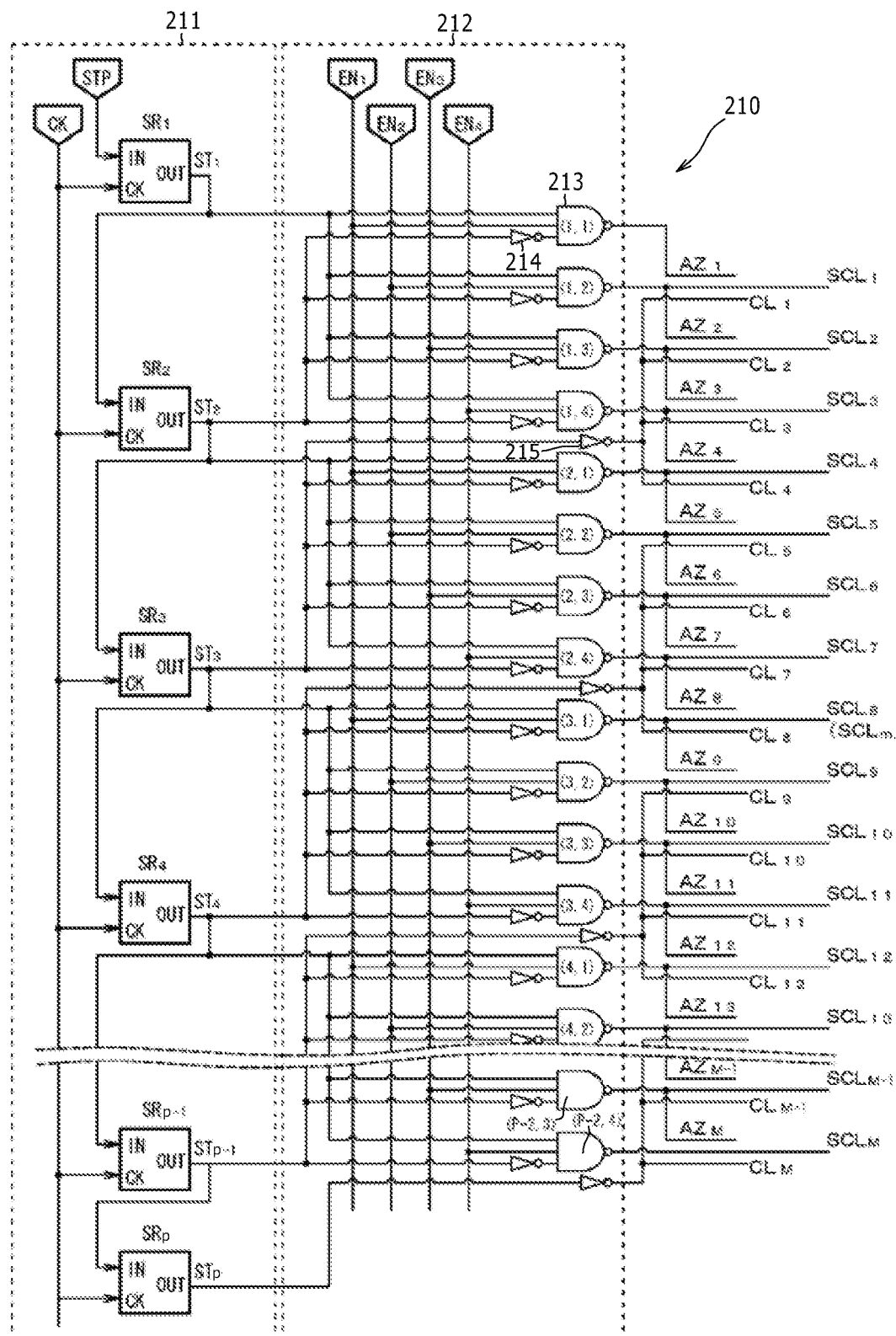
FIG. 13 is a circuit diagram showing a configuration of a scanning drive circuit according to Embodiment 2 of the present invention.
Figure 14:
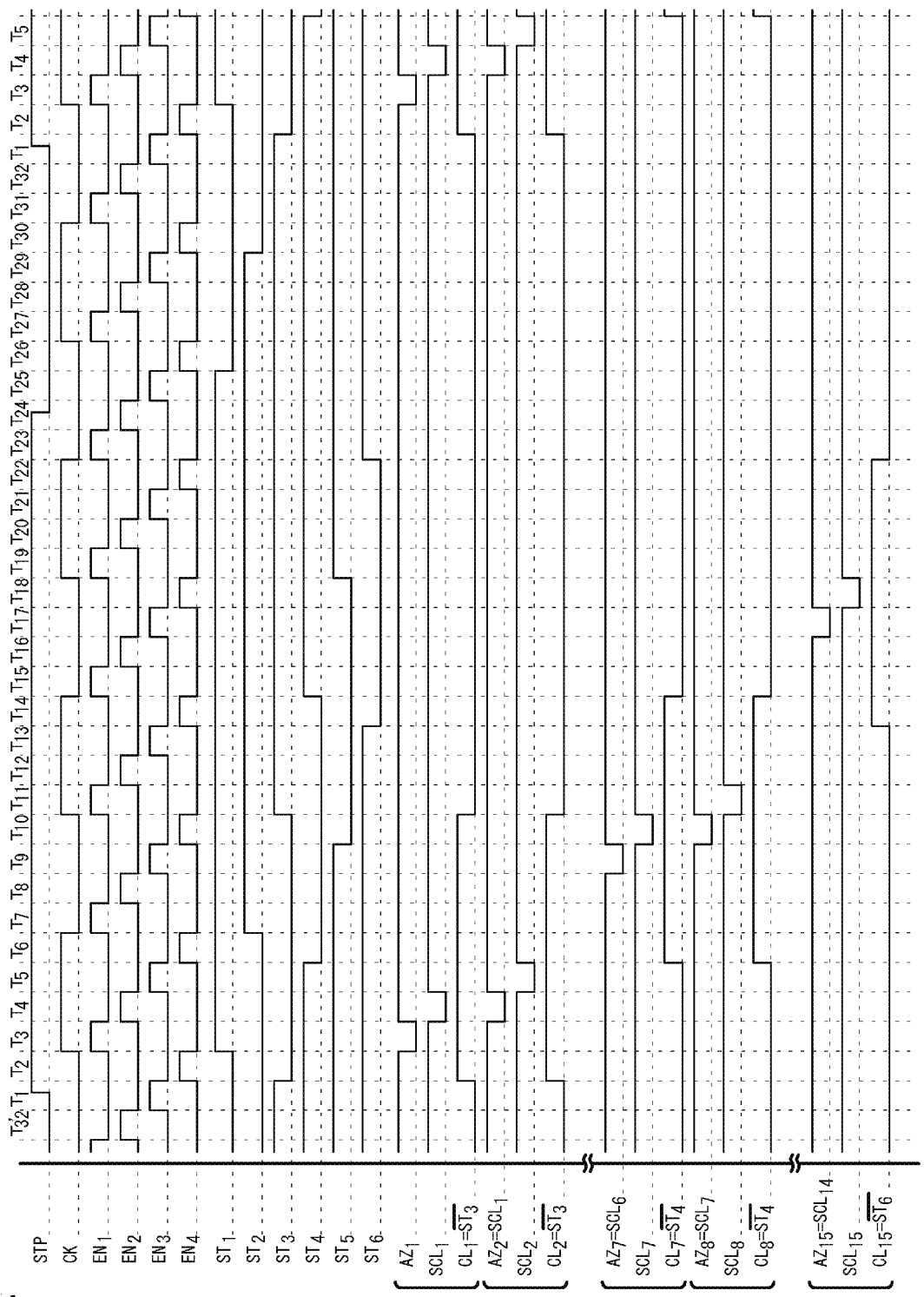
FIG. 14 is a schematic timing chart explaining an operation of the scanning drive circuit of Embodiment 2 shown in FIG. 13.

FIG. 13 is a circuit diagram showing a configuration of the scanning drive circuit 210 of Embodiment 2. Also, FIG. 14 is a schematic timing chart explaining an operation of the scanning drive circuit 210 of Embodiment 2 shown in FIG. 13.

The scanning drive circuit 110 of Embodiment 1 uses the first enable signal $EN_1$, and the second enable signal $EN_2$. On the other hand, the scanning drive circuit 210 of Embodiment 2 uses a third enable signal $EN_3$ and a fourth enable signal $EN_4$ in addition to the first enable signal $EN_1$, and the second enable signal $EN_2$. As a result, the number of constituent stages in a shift register portion composing the scanning drive circuit 210 can be reduced as compared with the case of the scanning drive circuit 110 of Embodiment 1.

As shown in FIG. 13, the scanning drive circuit 210 also includes:

(A) a shift register portion 211; and
(B) a logical circuit portion 212.

In this case, the shift register portion 211 includes P stages of shift registers $SR_1$ to $SR_P$. The start pulse STP inputted to the shift register portion 211 is successively shifted, and output signals ST are outputted from the P stages of shift registers $SR_1$ to $SR_P$, respectively. Also, the logical circuit portion 212 operates based on the output signals ST supplied from the P stages of shift registers $SR_1$ to $SR_P$, respectively, and the enable signals (the first enable signal $EN_1$, the second enable signal $EN_2$, the third enable signal $EN_3$, and the fourth enable signal $EN_4$ which will be described later in Embodiment 2).

When the output signal outputted from the shift register $SR_p$ in the p-th stage is expressed by $ST_p$, as shown in FIG. 14, the commencement of the start pulse STP in the output signal $ST_{p+1}$ outputted from the shift register $SR_{p+1}$ in the (p+1)-th stage is located between the commencement and the termination of the start pulse STP in the output signal $ST_p$. The shift register portion 211 operates based on the clock signal CK and the start pulse STP so as to fulfill the above condition.

The start pulse STP is a pulse which rises between the commencement and the termination of the time period $T_1$ shown in FIG. 14, and, for example, falls between the commencement and the termination of the time period $T_{24}$.

In Embodiment 1, the clock signal CK is the rectangular wave-like signal the polarity of which is inverted every two horizontal scanning time periods. On the other hand, in Embodiment 2, the clock signal CK is a rectangular wave-like signal a polarity of which is inverted every four horizontal scanning time periods. The start pulse STP in the output signal $ST_1$ from the shift register $SR_1$ is a pulse which rises at the commencement of the time period $T_3$, and falls at the termination of the time period $T_{25}$. Also, the start pulse STP in the output signal $ST_2$, $ST_3$, etc. from the shift registers in and after the shift register $SR_2$ in the second stage are a pulse which is obtained by successively shifting the previous pulse by the four horizontal scanning time periods.

In addition, one first enable signal to one Q-th enable signal exist individually between the commencement of the start pulse STP in the output signal $ST_p$, and the commencement of the start pulse STP in the output signal $ST_{p+1}$. Since Q=4 in Embodiment 2, one first enable signal $EN_1$, one second enable signal $EN_2$, one third enable signal $EN_3$, and one fourth enable signal $EN_4$ exist individually between the commencement of the start pulse STP in the output signal $ST_p$, and the commencement of the start pulse STP in the output signal $ST_{p+1}$. In other words, the first enable signal $EN_1$, the second enable signal $EN_2$, the third enable signal $EN_3$, and the fourth enable signal $EN_4$ are signals which are generated so as to fulfill the above condition, and are also basically rectangular wave-like signals which have the same period, and are different in phase from one another.

Specifically, the first enable signal $EN_1$ is the rectangular wave-like signal having the four horizontal scanning time periods as one period. The second enable signal $EN_2$ is a signal which lags the first enable signal $EN_1$ by a phase difference corresponding to one horizontal scanning time period. The third enable signal $EN_3$ is a signal which lags the first enable signal $EN_1$ by a phase difference corresponding to two horizontal scanning time periods. The fourth enable signal $EN_4$ is a signal which lags the first enable signal $EN_1$ by a phase difference corresponding to three horizontal scanning time periods. It should be noted that although in FIG. 14 as well, each of the first to fourth enable signals $EN_1$, $EN_2$, $EN_3$, and $EN_4$ is expressed in the form of the rectangular wave-like signal so as to be continuously held at the high level for one horizontal scanning time period, the present invention is by no means limited thereto. That is to say, each of the first to fourth enable signals $EN_1$, $EN_2$, $EN_3$, and $EN_4$ may be a rectangular wave-like signal so as to be continuously held at the high level for a time period shorter than one horizontal scanning time period.

Also, for example, one first enable signal $EN_1$ in the time period $T_3$, one second enable signal $EN_2$ in the time period $T_4$, one third enable signal $EN_3$ in the time period $T_5$, and one fourth enable signal $EN_4$ in the time period $T_6$ exist individually between the commencement of the start pulse STP in the output signal $ST_1$ (that is, the commencement of the time period $T_2$), and the commencement of the start pulse in the output signal $ST_2$ (that is, the commencement of the time period $T_7$). Similarly, one first enable signal $EN_1$, one second enable signal $EN_2$, one third enable signal $EN_3$, and one fourth enable signal $EN_4$ exist individually between the commencement of the start pulse in the output signal $ST_2$, and the commencement of the start pulse STP in the output signal $ST_3$. This also applies to any of the output signals in and after the output signal $ST_4$.

As shown in FIG. 13, the logical circuit portion 212 includes $\{(P-2)\times Q\}$ negative AND circuits 213. Specifically, the logical circuit portion 112 includes (1, 1)-th to (P-2, 4)-th negative AND circuits 213.

When a q-th enable signal is expressed by $EN_q$, as shown in FIGS. 13 and 14, a (p', q)-th negative AND circuit 213 generates a scanning signal based on an output signal $ST_{p'}$, a signal obtained by inverting a polarity of an output signal $ST_{p'+1}$, and a q-th enable signal $EN_q$. More specifically, the output signal $ST_{p'+1}$ is inverted by a plurality of a negative AND circuit 214 shown in FIG. 13, and the resulting signal is transmitted to an input side of the (p', q)-th negative AND circuit 213. Also, the output signal $ST_{p'}$ and the q-th enable signal $EN_q$ are both directly transmitted to an input side of the (p', q)-th negative AND circuit 213.

As shown in FIG. 13, a signal outputted from a (1, 2)-th negative AND circuit 213 is supplied to a scanning line $SCL_1$ connected to the display element 10 belonging to the first column, and a signal outputted from a (1, 3)-th negative AND circuit 213 is supplied to a scanning line $SCL_2$ connected to the display element 10 belonging to the second column. This also applies to any of other scanning lines SCL. That is to say, similarly to the description given with respect to Embodiment 1, a signal supplied from a (p', q)-th negative AND circuit 213 (the case of p'=1 and q=1 is excluded) is supplied to a scanning line $SCL_m$ connected to the display element 10 belonging to the m-th row $\{m=Q\times(p'-1)+(q-1)\}$.

Also, in the display element 10 to which the signal based on the scanning signal outputted from the (p', q)-th negative AND circuit 213 is supplied through the scanning line $SCL_m$, when q=1, a signal based on a scanning signal outputted from a (p'-1, q')-th negative AND circuit 213 is supplied from the initialization control line $AZ_m$ connected to the display element 10 concerned. Also, when q>1, a signal based on a scanning signal outputted from a (p', q")-th negative AND circuit 213 is supplied from the initialization control line $AZ_m$ connected to the display element 10 concerned.

More specifically, in the display element 10 to which the signal based on the scanning signal outputted from the (p', q)-th negative AND circuit 213 is supplied through the scanning line $SCL_m$, when q=1, the signal based on the scanning signal outputted from the (p'-1, q)-th negative AND circuit 213 is supplied from the initialization control line $AZ_m$ connected to the display element 10 concerned. Also, when q>1, the signal based on the scanning signal outputted from the (p', q-1)-th negative AND circuit 213 is supplied from the initialization control line $AZ_m$ connected to the display element 10 concerned.

In addition, when q=1, a signal based on an output signal $ST_{p'+1}$ outputted from a (p'+1)-th shift register $SR_{p'+1}$ is supplied to the display control line $CL_m$ connected to the display element 10 concerned. Also, when q>1, a signal based on an output signal $ST_{p'+2}$ outputted from a (p'+2)-th shift register $SR_{p'+2}$ is supplied to the display control line $CL_m$ connected to the display element 10 concerned. It should be noted that since each of the third transistor $TR_3$ and the fourth transistor $TR_4$ shown in FIG. 4, although being described in Embodiment 1 as well, is the p-channel TFT, the signal is supplied to the display control line $CL_m$ through the negative logical circuit 215.

A more detailed description will now be given with reference to FIG. 13. For example, here, attention is paid to the display element 10 to which a signal based on a scanning signal outputted from a (3, 1)-th negative AND circuit 213 is supplied through a scanning line $SCL_8$. In this case, a signal based on a scanning signal outputted from a (2, 4)-th negative AND circuit 213 is supplied to an initialization control line $AZ_8$ connected to the display element 10 concerned. Also, a signal based on an output signal $ST_4$ outputted from a fourth shift register $SR_4$ is supplied to a display control line $CL_8$ connected to the display element 10 concerned. In addition, here, attention is paid to the display element 10 to which a signal based on a scanning signal outputted from a (3, 2)-th negative AND circuit 213 is supplied through a scanning line $SCL_9$. In this case, a signal based on a scanning signal outputted from a (3, 1)-th negative AND circuit 213 is supplied to an initialization control line $AZ_9$ connected to the display element 10 concerned. Also, a signal based on an output signal $ST_5$ outputted from a fifth shift register $SR_5$ is supplied to a display control line $CL_9$ connected to the display element 10 concerned.

Figure 15:
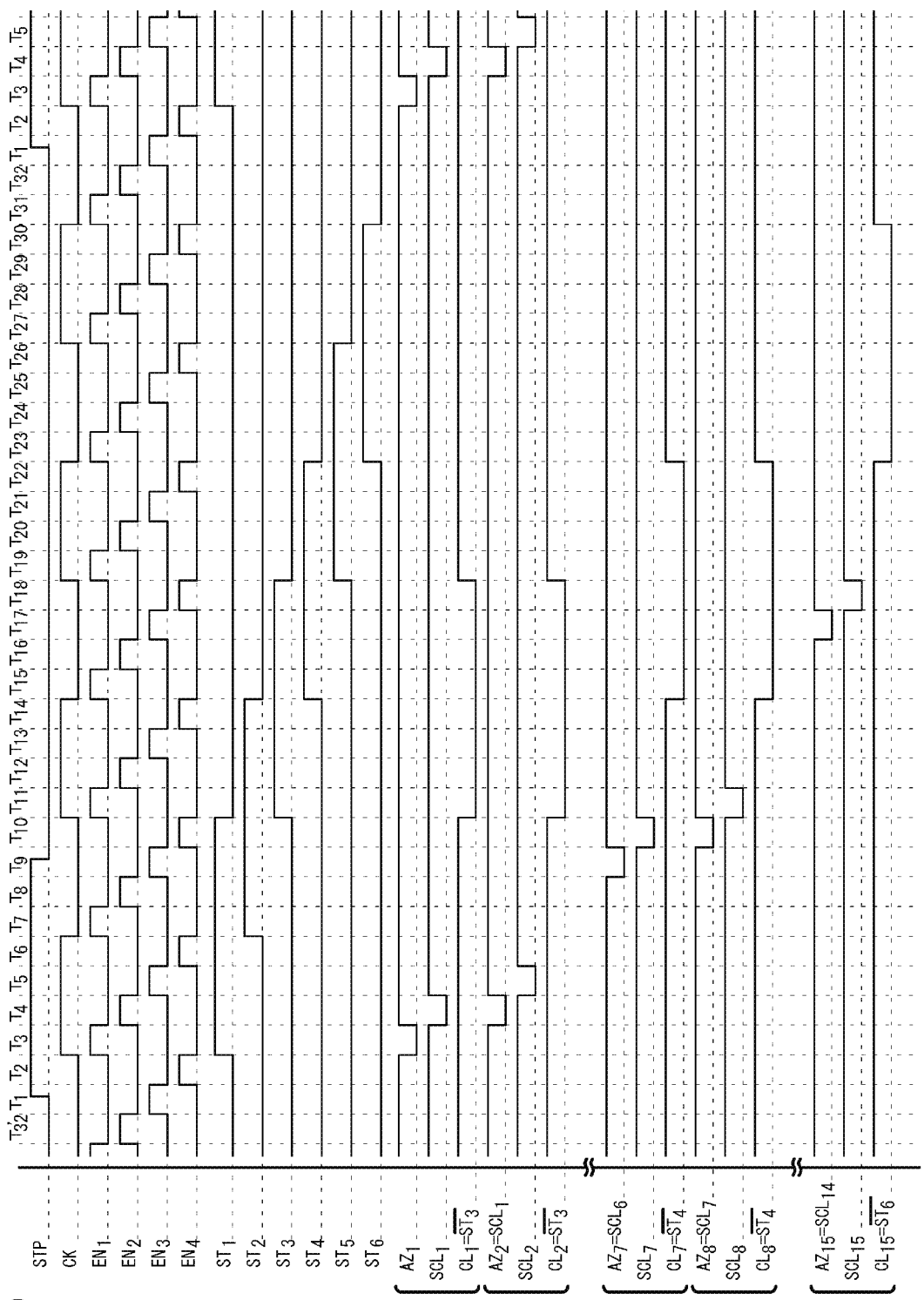
FIG. 15 is a schematic timing chart explaining an operation of the scanning drive circuit of Embodiment 2 when the timing at which the start pulse falls is changed.

Similarly to the description given with respect to Embodiment 1, even when the termination of the start pulse STP shown in FIG. 14 is changed in the scanning drive circuit 210 of Embodiment 2, the signals applied to the initialization control lines AZ and the scanning lines SCL, respectively, are free from an influence of the change in start pulse STP shown in FIG. 14. FIG. 15 is a schematic timing chart explaining an operation of the scanning drive circuit 210 when a timing at which the start pulse STP falls is changed. Specifically, for example, the timing at which the start pulse STP falls is changed so that the start pulse STP falls between the commencement and the termination of the time period $T_9$. As apparent from comparison of the schematic timing chart shown in FIG. 15 with the schematic timing chart shown in FIG. 14, in the case of the schematic timing chart shown in FIG. 15, only the waveforms of the signals supplied to the display control lines CL, respectively, change.

Figure 16:
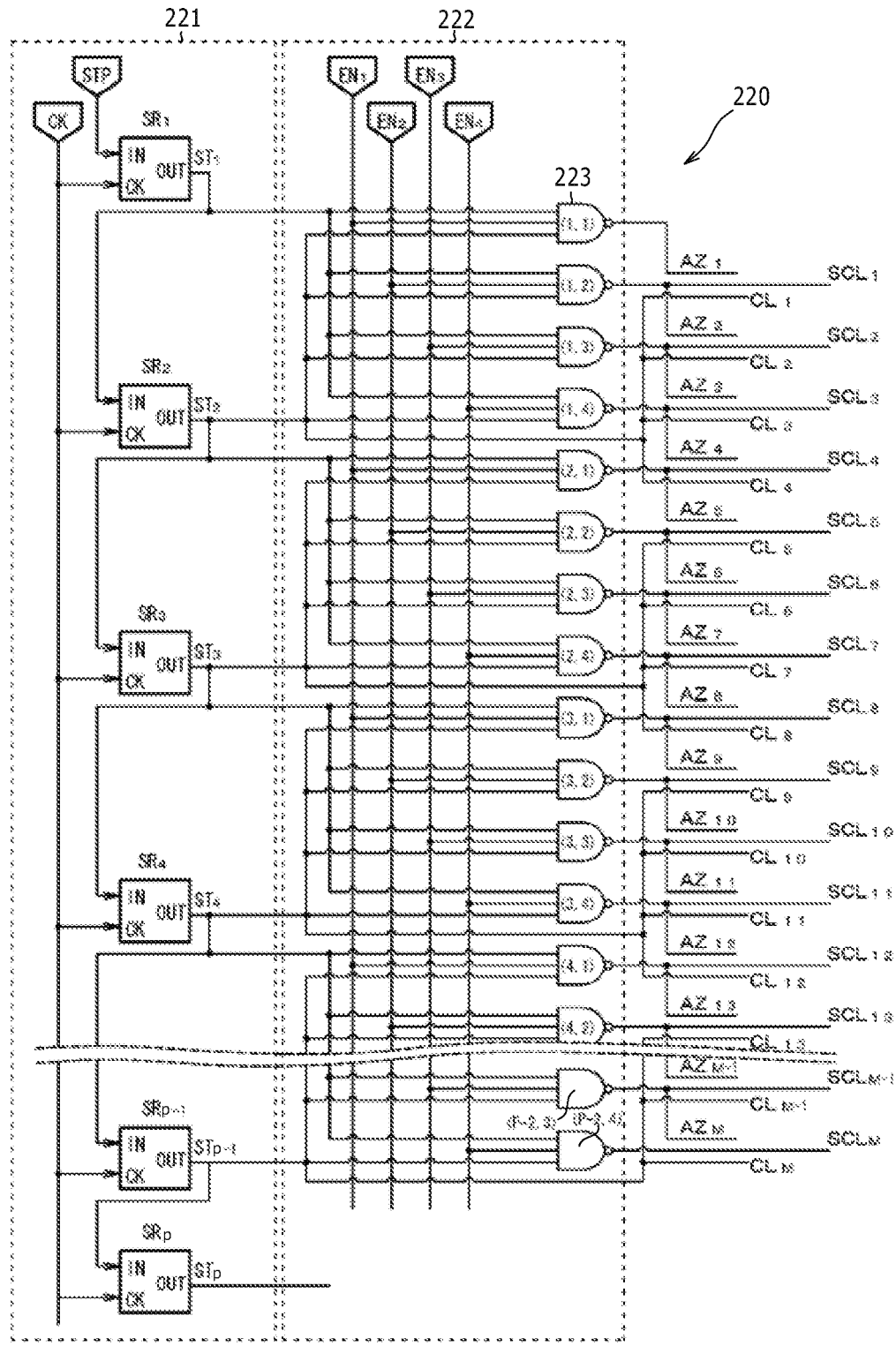
FIG. 16 is a circuit diagram showing a configuration of a scanning drive circuit according to Comparative Example of Embodiment 2.

FIG. 16 is a circuit diagram showing a configuration of a scanning drive circuit 220 of Comparative Example. The scanning drive circuit 220 corresponds to the scanning drive circuit 120 of Comparative Example described in contrast with Embodiment 1. In the scanning drive circuit 220, the configuration of a logical circuit portion 222 is different from that of the logical circuit portion 212 of the scanning drive circuit 210 of Embodiment 2. A configuration of a shift register 221 of the scanning drive circuit 220 is the same as that of the shift register 211 of the scanning drive circuit 210.

Similarly to the description given with respect to Embodiment 1, the negative logical circuits 214 and 215 shown in FIG. 13 are both omitted in the scanning circuit 220 of Comparative Example. In addition, when q=1, a signal based on an output signal $ST_{p'}$ outputted from the p'-th shift register $SR_{p'}$ is supplied from the corresponding one, of the display control lines, connected to the display element 10 to the display element 10 to which the signal based on the scanning signal outputted from the (p', q)-th negative AND circuit 223 is supplied through the corresponding one of the scanning lines SCL. Also, when q>1, a signal based on an output signal $ST_{p'+1}$ outputted from the (p'+1)-th shift register $SR_{p'+1}$ is supplied to the display element 10 concerned.

Similarly to the description given with respect to Embodiment 1, in the scanning drive circuit 220 having the configuration described above, a (p', q)-th negative AND circuit 223 generates the scanning signal based on the output signal $ST_{p'}$, the output signal $ST_{p'+1}$, and the q-th enable signal $EN_q$. Therefore, when a plurality of q-th enable signals $EN_q$ exist within a time period for which the start pulse STP of the output signal $ST_{p'}$, and the start pulse STP of the output signal $ST_{p'+1}$ overlap each other, a plurality of scanning signals are generated for the overlapping time period. For this reason, if the start pulse STP rises between the commencement and the termination of the time period $T_1$, the start pulse STP needs to be set so as to fall between the commencement and the termination of the time period $T_9$.

Figure 17:
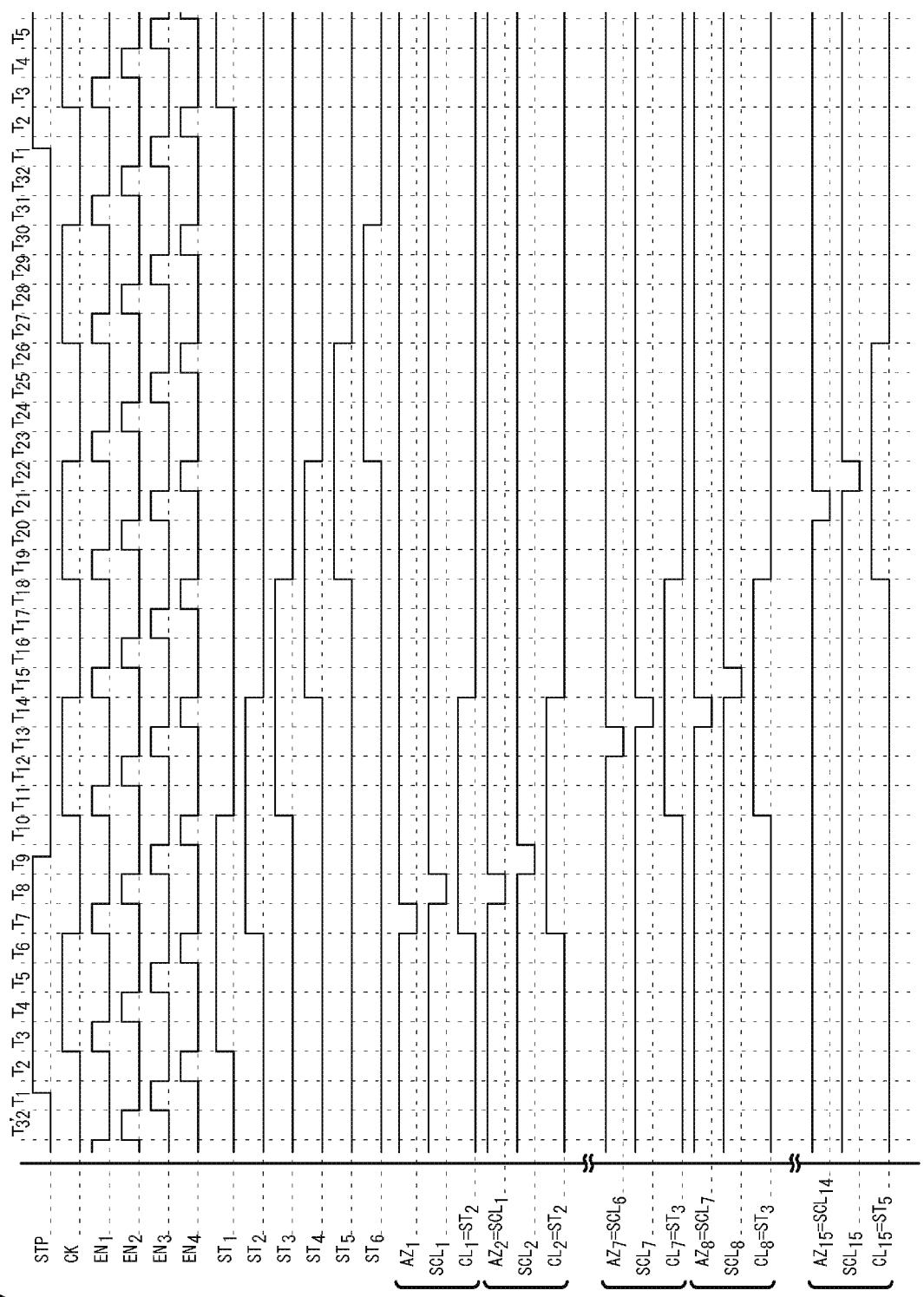
FIG. 17 is a schematic timing chart explaining an operation of the scanning drive circuit of Comparative Example shown in FIG. 16 when a start pulse rises between commencement and termination of a time period $T_1$, and falls between commencement and termination of a time period $T_9$.

FIG. 17 is a schematic timing chart explaining an operation of the scanning drive circuit 220 shown in FIG. 16 when the start pulse STP rises between the commencement and the termination of the time period $T_1$, and falls between the commencement and the termination of the time period $T_9$. As apparent from comparison of the schematic timing chart shown in FIG. 17 with the schematic timing chart shown in FIG. 14, although there are phase shifts in the signals, signals which are approximately the same as those shown in FIG. 3 are supplied to the initialization control lines AZ, the scanning lines SCL, and the display control lines CL, respectively.

Figure 18:
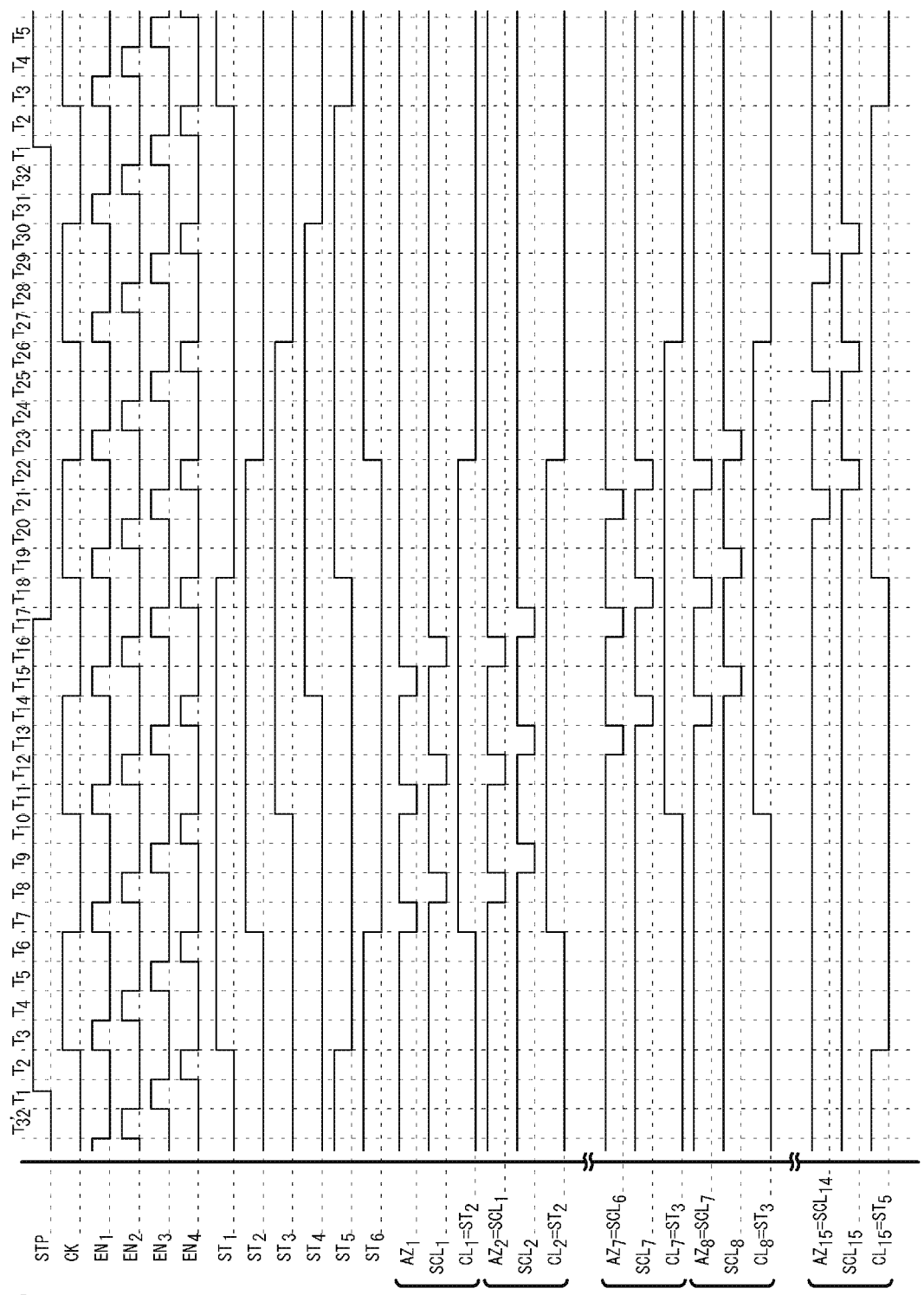
FIG. 18 is a schematic timing chart explaining an operation of the scanning drive circuit of Comparative Example shown in FIG. 16 when the start pulse falls between commencement and termination of a time period $T_{17}$.
Figure 19:
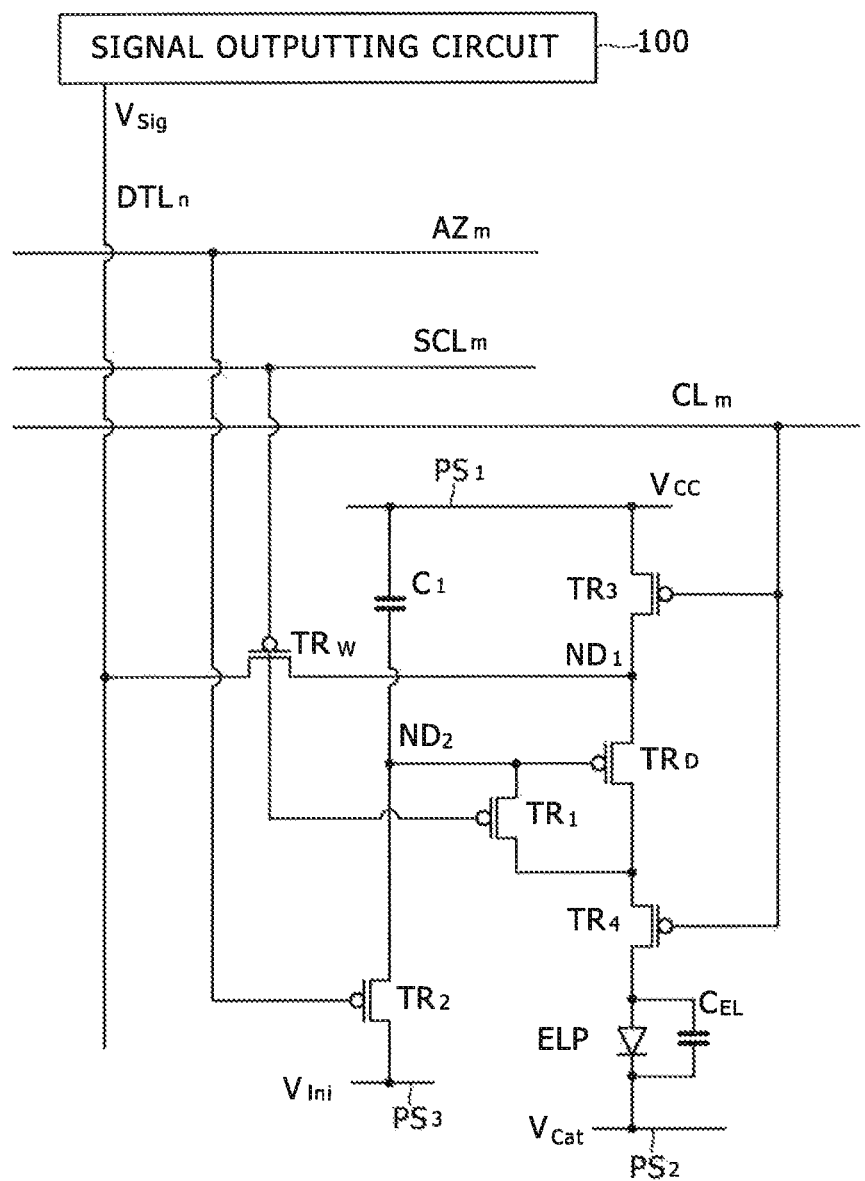
FIG. 19 is an equivalent circuit diagram showing a configuration of a drive circuit composing a display element belonging to an m-th row and an n-th column in an existing display device having display elements two-dimensionally disposed in a matrix.
Figure 20A:
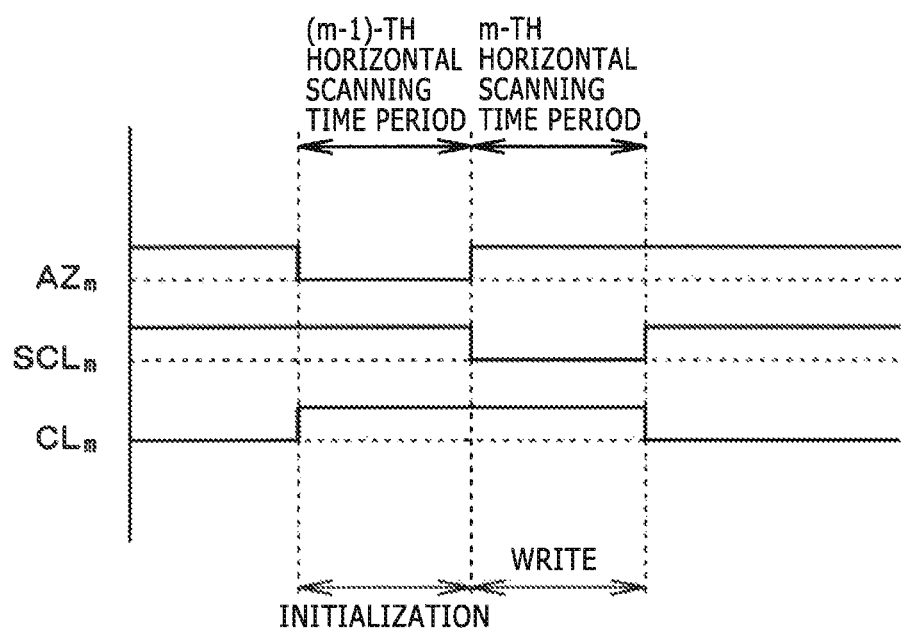
FIGS. 20A, and 20B to 20D are respectively a schematic timing chart of signals on an initialization control line, a scanning line and a display control line, and equivalent circuit diagrams schematically showing ON/OFF states and the like of six transistors composing the drive circuit.
Figure 20B:
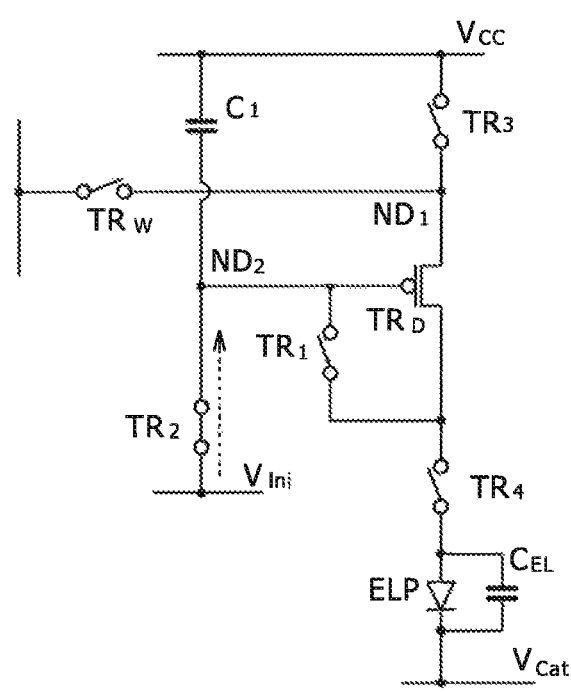
Figure 20C:
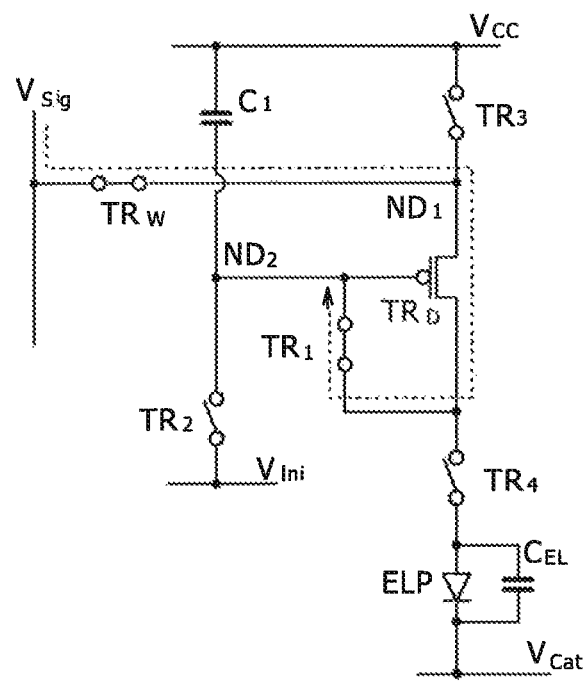
Figure 20D:
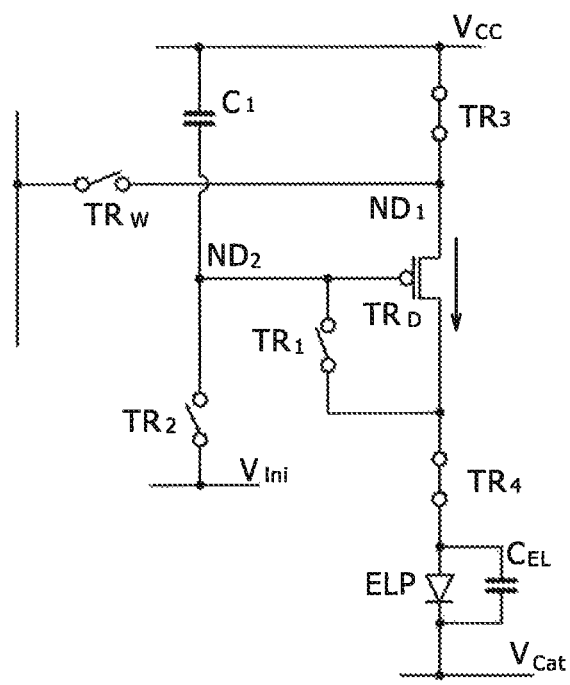

Next, FIG. 18 shows a schematic timing chart explaining an operation of the scanning drive circuit 220 when, for example, the start pulse STP falls between the commencement and the termination of the time period $T_{17}$. In this case, a plurality of scanning signals are generated for the time period for which the start pulse STP of the output signal $ST_{p'}$, and the start pulse STP of the output signal $ST_{p'+1}$ overlap each other. As has been described above, in the scanning drive circuit 220 of Comparative Example, the changing of the width of the start pulse STP exerts an influence on the signals supplied to the scanning lines SCL and the initialization control line AZ, respectively, and affects the operation of the display device.

It should be noted that although the present invention has been described so far based on the preferred embodiments, the present invention is by no means limited thereto. The scanning drive circuits and the display devices described in Embodiments 1 and 2, the configuration and the structures of the various kinds of constituent elements composing the display element, and the processes in the operations of the display devices are illustrative only, and thus can be suitably changed.

For example, in the drive circuit 11 composing the display element 10 shown in FIG. 4, when each of the third transistor $TR_3$ and the fourth transistor $TR_4$ is configured in the form of an n-channel TFT, the negative logical circuit 15 shown in FIG. 1, and the negative logical circuit 215 shown in FIG. 13 are unnecessary. In such a manner, the polarities of the signals outputted from the scanning drive circuit may suitably be set in accordance with the configuration of the display element, and thus the resulting signals may be supplied to the scanning lines, the initialization control lines, and the display control lines, respectively.

The present application contains subject matter related to that disclosed in Japanese Priority Patent Application JP 2008-149171 filed in the Japan Patent Office on Jun. 6, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A display device, comprising:
 a plurality of pixel circuits in a display area;
 a plurality of first scanning lines;
 a plurality of second scanning lines; and
 a plurality of third scanning lines;
 a scanning circuit facing to a first side of the display area and configured to drive the plurality of pixel circuits via the plurality of first scanning lines, the plurality of second scanning lines, and the plurality of third scanning lines:
 wherein the scanning circuit includes a plurality of stages and is configured such that:
 (a) a first stage of the plurality of stages receives an input pulse;
 (b) each of the plurality of stages receives a first pulse signal, a second pulse signal, and a third pulse signal;
 (c) the first pulse signal and the second pulse signal are rectangular waves having a same frequency and a phase difference between the first pulse signal and the second pulse signal is approximately 180 degrees, and
 (d) the scanning circuit supplies a plurality of output signals in response to the received first, seconds and third pulse signals,
 wherein each of the plurality of pixel circuits includes a write transistor, a drive transistor, a first switching transistor, a second switching transistor, a capacitor, and a light emitting element, and
 wherein a duration of a light emitting period of the respective light emitting element in each of the plurality of pixel circuits within one frame period is variably controlled by changing a width of the input pulse,
 a drive current is supplied from a voltage line to the light emitting element via the first switching transistor and the drive transistor, an initializing potential is supplied from an initializing voltage line to the capacitor via the second switching transistor, a data potential is supplied from a video signal line to the capacitor via the write transistor, a gate terminal of the first switching transistor is connected to the scanning circuit via one of the plurality of first scanning lines, a gate terminal of the write transistor is connected to the scanning circuit via one of the plurality of second scanning lines, and a gate terminal of the second switching transistor is connected to the scanning circuit via one of the plurality of third scanning lines;

wherein the each of the plurality of stages is configured to receive a fourth pulse signal, the third pulse signal and the fourth pulse signal are rectangular waves having a same frequency and a phase difference between the third pulse signal and the fourth pulse signal is approximately 180 degrees.

2. The display device according to claim 1, wherein the first pulse signal and the second pulse signal are enable signals.

3. The display device according to claim 1, wherein the third pulse signal is a clock signal.

4. The display device according to claim 1, wherein the first pulse signal has a first number of pulses within said one frame period, the second pulse signal has a second number of pulses within said one frame period, the first number being a same number as the second number.

5. The display device according to claim 1, wherein the light emitting element includes an anode electrode, a light emitting layer, and a cathode electrode, the anode electrode is provided on a first insulation layer covering a plurality of drive circuits, and the cathode electrode is provided on a second insulation layer which is arranged on the first insulation layer, and the cathode electrode is connected to a second power-supply line via a first contact and a second contact.

6. The display device according to claim 5, wherein the first contact is formed in the first insulation layer, and the second contact is formed in the second insulation layer.

7. The display device according to claim 1, wherein the scanning circuit includes a plurality of shift registers configured to shift the input pulse, each of the plurality of shift registers corresponding to the each of the plurality of stages.

8. The display device according to claim 1, wherein changing the width of the input pulse does not affect a conductive state of the write transistor.

9. The display device according to claim 1, wherein changing the width of the input pulse does not affect a conductive state of the write transistor and the second switching transistor.

10. The display device according to claim 1, wherein a ratio between the light emitting period and a non-light emitting period is adjusted by changing the width of the input pulse.

11. A scanner circuit for driving a display device including a plurality of pixels having light emitting elements, the scanner circuit comprising:

a plurality of stages, and output terminals connected to scanning lines each of which controls a duration of a light emitting period of the respective light emitting element in each of the plurality of pixels;

wherein the plurality of the stages are configured such that:

(a) a first stage of the plurality of stages receives an input pulse;

(b) each of the plurality of stages receives a first pulse signal, a second pulse signal and a third pulse signal;

(c) the first pulse signal and the second pulse signal are rectangular waves having a same frequency and a phase difference between the first pulse signal and the second pulse signal is approximately 90 degrees 180 degrees, and (d) the output terminals supply output signals in response to the received first, second, and third pulse signals, wherein the duration of the light emitting period of the respective light emitting element in each of the plurality of pixel circuits within one frame period is variably controlled by changing a width of the input pulse;

wherein the each of the plurality of stages is configured to receive a fourth pulse signal, the third pulse signal and the fourth pulse signal are rectangular waves having a same frequency and a phase difference between the third pulse signal and the fourth pulse signal is approximately 180 degrees.

12. The scanner circuit according to claim 11, wherein the first pulse signal and the second pulse signal are enable signals.

13. The scanner circuit according to claim 11, wherein the third pulse signal is a clock signal.

14. The scanner circuit according to claim 11, wherein the first pulse signal has a first number of pulses within said one frame period, the second pulse signal has a second number of pulses within said one frame period, the first number being a same number as the second number.

* * * * *